(12) United States Patent
Brave et al.

(10) Patent No.: US 8,095,523 B2
(45) Date of Patent: Jan. 10, 2012

(54) METHOD AND APPARATUS FOR CONTEXT-BASED CONTENT RECOMMENDATION

(75) Inventors: Scott Brave, San Jose, CA (US); Jack Jia, Los Altos Hills, CA (US)

(73) Assignee: Baynote, Inc., San Jose, CA (US)

( * ) Notice: Subject to any disclaimer, the term of this patent is extended or adjusted under 35 U.S.C. 154(b) by 578 days.

(21) Appl. No.: 12/188,850

(22) Filed: Aug. 8, 2008

(65) Prior Publication Data
US 2009/0037355 A1 Feb. 5, 2009

Related U.S. Application Data

(63) Continuation-in-part of application No. 11/319,928, filed on Dec. 27, 2005, now Pat. No. 7,698,270.

(60) Provisional application No. 60/640,872, filed on Dec. 29, 2004, provisional application No. 60/954,677, filed on Aug. 8, 2007.

(51) Int. Cl.
*G06F 17/30* (2006.01)
(52) U.S. Cl. .................. 707/705; 707/802
(58) Field of Classification Search ........... 707/999.001, 707/705, 802
See application file for complete search history.

(56) References Cited

U.S. PATENT DOCUMENTS

| | | | |
|---|---|---|---|
| 5,794,178 A * | 8/1998 | Caid et al. .................. 704/9 |
| 5,867,799 A | 2/1999 | Lang et al. | |
| 5,890,149 A | 3/1999 | Schmonsees | |
| 5,924,105 A | 7/1999 | Punch, III et al. | |
| 5,983,214 A | 11/1999 | Lang et al. | |
| 6,016,475 A | 1/2000 | Miller et al. | |
| 6,041,311 A * | 3/2000 | Chislenko et al. .............. 705/27 |
| 6,049,777 A * | 4/2000 | Sheena et al. .................. 705/10 |
| 6,070,133 A | 5/2000 | Brewster et al. | |
| 6,112,186 A * | 8/2000 | Bergh et al. ..................... 705/10 |
| 6,202,058 B1 * | 3/2001 | Rose et al. ..................... 706/45 |
| 6,327,590 B1 * | 12/2001 | Chidlovskii et al. ......... 707/734 |
| 6,334,124 B1 | 12/2001 | Bouchard et al. | |
| 6,438,579 B1 * | 8/2002 | Hosken ......................... 709/203 |
| 6,493,703 B1 | 12/2002 | Knight et al. | |
| 6,502,091 B1 * | 12/2002 | Chundi et al. ................ 707/738 |
| 6,687,696 B2 | 2/2004 | Hofmann et al. | |
| 6,839,680 B1 * | 1/2005 | Liu et al. ........................ 705/10 |
| 6,842,877 B2 | 1/2005 | Robarts et al. | |

(Continued)

FOREIGN PATENT DOCUMENTS
CN 1096038 C 12/2002
(Continued)

OTHER PUBLICATIONS
Suh et al., "Context-based User Profile Management for Personalized Services", ubiPCMM 2005, pp. 64-73.*
(Continued)

*Primary Examiner* — Hung T Vy
*Assistant Examiner* — Phuong Thao Cao
(74) *Attorney, Agent, or Firm* — David R. Stevens; Stevens Law Group

(57) ABSTRACT

Starting with the people in and around enterprises, the expertise and work patterns stored in people's brains as exhibited in their daily behavior is detected and captured. A behavioral based knowledge index is thus created that is used to produce expert-guided, personalized information.

8 Claims, 30 Drawing Sheets

U.S. PATENT DOCUMENTS

| | | | |
|---|---|---|---|
| 6,853,998 B2* | 2/2005 | Biebesheimer et al. | 707/765 |
| 6,938,035 B2 | 8/2005 | Driesch et al. | |
| 6,943,877 B2 | 9/2005 | Diehr et al. | |
| 7,031,961 B2 | 4/2006 | Pitkow et al. | |
| 7,092,936 B1 | 8/2006 | Alonso et al. | |
| 7,093,012 B2 | 8/2006 | Olstad et al. | |
| 7,162,473 B2 | 1/2007 | Dumais et al. | |
| 7,203,909 B1* | 4/2007 | Horvitz et al. | 715/765 |
| 7,295,995 B1* | 11/2007 | York et al. | 705/26.8 |
| 7,343,365 B2 | 3/2008 | Farnham et al. | |
| 7,349,827 B1* | 3/2008 | Heller et al. | 702/186 |
| 7,424,488 B2* | 9/2008 | Aggarwal et al. | 1/1 |
| 7,856,441 B1* | 12/2010 | Kraft et al. | 707/758 |
| 2001/0018698 A1 | 8/2001 | Uchino et al. | |
| 2002/0016786 A1* | 2/2002 | Pitkow et al. | 707/3 |
| 2002/0029208 A1* | 3/2002 | Josephson | 707/1 |
| 2002/0075320 A1* | 6/2002 | Kurapati | 345/811 |
| 2002/0078091 A1 | 6/2002 | Vu et al. | |
| 2002/0082901 A1 | 6/2002 | Dunning et al. | |
| 2002/0103698 A1 | 8/2002 | Cantrell | |
| 2002/0103789 A1 | 8/2002 | Turnbull et al. | |
| 2002/0107853 A1* | 8/2002 | Hofmann et al. | 707/7 |
| 2002/0116421 A1 | 8/2002 | Fox et al. | |
| 2002/0147895 A1* | 10/2002 | Glance et al. | 711/158 |
| 2002/0149614 A1* | 10/2002 | Biebesheimer et al. | 345/738 |
| 2002/0188589 A1* | 12/2002 | Salmenkaita et al. | 707/1 |
| 2002/0199009 A1 | 12/2002 | Willner et al. | |
| 2003/0004996 A1 | 1/2003 | Novaes | |
| 2003/0005053 A1 | 1/2003 | Novaes | |
| 2003/0043815 A1* | 3/2003 | Tinsley et al. | 370/395.21 |
| 2003/0158855 A1* | 8/2003 | Farnham et al. | 707/102 |
| 2004/0039630 A1 | 2/2004 | Begole et al. | |
| 2004/0088276 A1* | 5/2004 | Elder et al. | 707/1 |
| 2004/0088312 A1 | 5/2004 | Elder et al. | |
| 2004/0088315 A1 | 5/2004 | Elder et al. | |
| 2004/0088322 A1 | 5/2004 | Elder et al. | |
| 2004/0088323 A1 | 5/2004 | Elder et al. | |
| 2004/0088325 A1 | 5/2004 | Elder et al. | |
| 2004/0117222 A1 | 6/2004 | Rokosz et al. | |
| 2004/0205643 A1* | 10/2004 | Harrington | 715/530 |
| 2004/0230572 A1 | 11/2004 | Omoigui | |
| 2004/0249774 A1* | 12/2004 | Caid et al. | 706/14 |
| 2004/0254911 A1* | 12/2004 | Grasso et al. | 707/1 |
| 2004/0263639 A1 | 12/2004 | Sadovsky et al. | |
| 2004/0267700 A1* | 12/2004 | Dumais et al. | 707/2 |
| 2005/0027704 A1* | 2/2005 | Hammond et al. | 707/5 |
| 2005/0060312 A1 | 3/2005 | Curtiss et al. | |
| 2005/0091184 A1* | 4/2005 | Seshadri et al. | 707/1 |
| 2005/0108630 A1 | 5/2005 | Wasson et al. | |
| 2005/0125382 A1* | 6/2005 | Karnawat et al. | 707/3 |
| 2005/0165805 A1 | 7/2005 | Novaes | |
| 2005/0251497 A1* | 11/2005 | Barth et al. | 707/1 |
| 2006/0036683 A1* | 2/2006 | Bracewell et al. | 709/203 |
| 2006/0136409 A1* | 6/2006 | Leidig | 707/4 |
| 2006/0161553 A1* | 7/2006 | Woo | 707/10 |
| 2006/0200432 A1* | 9/2006 | Flinn et al. | 706/12 |
| 2006/0218115 A1* | 9/2006 | Goodman et al. | 707/1 |
| 2006/0259344 A1* | 11/2006 | Patel et al. | 705/9 |
| 2007/0033105 A1* | 2/2007 | Collins et al. | 705/14 |
| 2007/0038600 A1* | 2/2007 | Guha | 707/3 |
| 2007/0043609 A1 | 2/2007 | Imam et al. | |
| 2007/0050253 A1* | 3/2007 | Biggs et al. | 705/14 |
| 2007/0055657 A1* | 3/2007 | Yano | 707/3 |
| 2007/0106633 A1* | 5/2007 | Reiner | 707/1 |
| 2007/0124297 A1* | 5/2007 | Toebes | 707/5 |
| 2007/0150466 A1* | 6/2007 | Brave et al. | 707/5 |
| 2007/0255735 A1 | 11/2007 | Taylor et al. | |
| 2008/0086558 A1* | 4/2008 | Bahadori et al. | 709/224 |
| 2008/0097987 A1* | 4/2008 | Shih et al. | 707/5 |
| 2008/0120287 A1* | 5/2008 | Guan et al. | 707/5 |
| 2008/0195664 A1* | 8/2008 | Maharajh et al. | 707/104.1 |
| 2008/0228537 A1* | 9/2008 | Monfried et al. | 705/7 |
| 2008/0301541 A1* | 12/2008 | Karidi | 715/206 |
| 2009/0070326 A1* | 3/2009 | Kraft | 707/5 |

FOREIGN PATENT DOCUMENTS

| | | |
|---|---|---|
| CN | 1527976 A | 9/2004 |
| WO | WO 01/93076 | 12/2001 |
| WO | WO 02/08950 | 1/2002 |
| WO | WO 2004/075466 | 9/2004 |
| WO | WO 2005/029368 | 3/2005 |
| WO | WO 2005/052727 | 6/2005 |
| WO | WO 2006/071931 A2 | 7/2006 |

OTHER PUBLICATIONS

Thawani et al., "Context Aware Personalized Ad Insertion in an Interactive TV Environment", 2004, 7 pages.*

Brown et al., "Context-aware Retrieval: Exploring a New Environment for Information Retrieval and Information Filtering", Personal and Ubiquitous Computing Journal, vol. 5, Issue 4, Dec. 2001, 11 pages.*

Almeida. A Community Aware Search Engine, ACM, May 2004, pp. 413-421.

Ferguson, I.A. et al.; "Multiagent Learning and Adaptation in an Information Filtering Market"; 1996; Interactive Information Group, Institute for Information Technology, National Research Council; Ottawa ON, Canada.

Chirita, P.A. et al.; "Finding Related Pages Using the Link Structure of the WWW"; Sep. 2004; L3S and University of Hannover, Germany.

Ianni, G.; "Intelligent Anticipated Exploration of Web Sites"; Oct. 9, 2001; INFSYS Research Report 1843-01-09, Austria;.

Jameson, A.; "User-Adaptive and Other Smart Adaptive Systems: Possible Synergies"; Dec. 13-14, 2001; Proceedings of the First EUNITE Symposium, Tenerife.

Hsu et al.; "Learning Database Abstractions for Query Reformulation"; 1993; Department of Computer Science, University of Southern California, Los Angeles, CA.

Ianni, G.: "An Agent System Reasoning About the Web and the User"; May 17-22, 2004; Department of Mathematics, Universita della Calabria, Rende, Italy.

Almeida, R.B. et al.; "A Community-Aware Search Engine"; 2004; Department of Computer Science, Universidade Federal de Minas Gerais, Belo Horizonte, MG, Brazil.

Boyan, J. et al.; "A Machine Learning Architecture for Optimizing Web Search Engines"; 1996; AAAI Workshop on Internet-Based Information Systems, Portland, Oregon.

Joachims, T. et al.; "WebWatcher: A Tour Guide for the World Wide Web"; Sep. 1996; School of Computer Science, Carnegie Mellon University, Pittsburg, PA.

Ruthven et al.; "Selective Relevance Feedback Using Term Characteristics"; 1999; Department of Computing Science, University of Glasgow, Scotland.

Vogt, C.C. et al.; "Using Relevance to Train a Linear Mixture of Experts"; 1997; Computer Science and Engineering 0114, University of California, San Diego.

Pohle, C. et al.; "Building and Exploiting Ad-Hoc Concept Hierarchies for Web Log Analysis"; 2002; Data Warehousing and Knowledge Discovery. 4th International Conference, DaWaK 2002. Proceedings (Lecture Notes in Computer Science vol. 2454) p. 83-93; Springer-Verlag, Berlin, Germany.

Hammer, M. et al.; "Acquisition and Utilization of Access Patterns in Relational Data Base Implementation"; 1976 Joint Workshop on Pattern Recognition and Artificial Intelligence p. 14; IEEE, New York, NY, USA.

Drogan, M. et al.; "Extracting Riches from the Web: Web Mining/Personalization"; SCI 2003. 7th World Multiconference on Systemics, Cybernetics and Informatics Proceedings vol. 16 p. 214-219; IIIS; Orlando, FL, USA.

Dean, J. et al.; "Finding Related Pages in the World-Wide Web"; May 17, 1999; Computer Networks vol. 31, No. 11-16 p. 1467-1479; Elsevier; Netherlands.

Weideman, M. et al.; "The Effect of Search Engine Keyword Choice and Demographic Features on Internet Searching Success"; Jun. 2004 Information Technology and Libraries, 23, 2, 58(8).

Graham, P., et al; "A Mechanism for the Dynamic Construction of Clusters Using Active Networks"; 2001; Proceedings International Conference on Parallel Processing Workshops. IEEE Computer Soc. Los Alamitos, CA.

Zhao, D.G.; "Usage Statistics Collection and Management in the ELINOR Electronic Library"; 1995; Journal of Information Science. vol. 21. No. 1 p. 1-9. U.K.

Osman, I.M.; "Matching Storage Organization to Usage Pattern in Relational Data Bases"; 1974; Univ. Durham, U.K.

Iamnitchi, A.I.; "Resource Discovery in Large Resource-Sharing Environments"; 2003; The University of Chicago. vol. 6410B of Dissertations Abstracts International. p. 5035.

Arpaci-Dusseau, A.C; "Implicit Coscheduling: Coordinated Scheduling with Implicit Information in Distributed Systems"; Aug. 2001; ACM Transactions on Computer Systems, 19, 3, 283.

Asakawa, K., et al.; "Neural Networks in Japan"; Mar. 1994; (Artificial Intelligence)(Cover Story)(Technical). Communications of the ACM, v37. n3. p. 106(7).

De Meo, P., et al.; An XML-Based Adaptive Multi-Agent System for Handling E-Commerce Activities; ICWS-Europe 2003. LNCS 2853. p. 152-166.

Chan, P.K.; "A Non-Invasive Learning Approach to Building Web User Profiles"; 1999; KDD-00 Workshop on Web Usage Analysis and User Profiling.

Ruthven, I.; "Incorporating Aspects of Information Use into Relevance Feedback"; 1992; Journal of Information Retrieval. 2, 1-5. Kluwer Academic Publishers, Boston.

Eichorn G., et al.; "The NASA Astrophysics Data System: The Search Engine and its User Interface"; 1999; Harvard-Smithsonian Center for Astrophsyics, Cambridge, MA.

Freeberg; "Will Lycos Settle Claims Against Tivo, Blockbuster & Netflix Out of Court?" Aug. 16, 2007. http://media.seekingalpha.com/article/44627.

\* cited by examiner $$P(X = x' | C = c') = sim_x(\chi, \chi') \frac{1}{U} \sum_{u=1}^{U} \chi_u * sim_c(c_u, c')$$

X: variable of interest
x': candidate value for variable
$sim_x$: similarity function comparing values for X
C: context
c': current context
$sim_c$: similarity function comparing contexts
U: Users
$\chi_u$: a particular user's value (assessment) for X
$c_u$: the context of the user's assessment

- E.g., To determine probability that a particular document x' is the best recommendation given a particular context c' (such as a nav/search history)
  - Perform a "weighted average" over all user assessments of documents, where the weight is based on the similarity between that user's context at the time of evaluation and the current context. Documents are averaged over a chosen attribute, e.g., term-space representation (note: the WOC equation can be used to arrive at the term-space representation as well)
  - Take this averaged "wisdom of crowds" value and compare it using an appropriate similarity metric to the candidate document to arrive at a probability that the candidate is "best"
- E.g., if the current context and all contexts of evaluation are identical, this reduces to a simple average. Surowiecki's "guess the weight of the cow" example fits this scenario

① Social Search - 20x more useful content
UseRank™ & Implict Learning
Intent Driven & Adaptive
Implict Folksonomy
Works with Endeca, FAST, any engine
Support Audio, Video & all Content Types

② Related Content
Most related & useful content
Endorsed by like minded peers
Filters out low value content

③ Category Most Popular
Content with the greatest value
Promotion that leads to conversations
Site or topic level

④ Next Steps
Common next steps lead to conversions
Next step in a business process
Natural next set of content to read

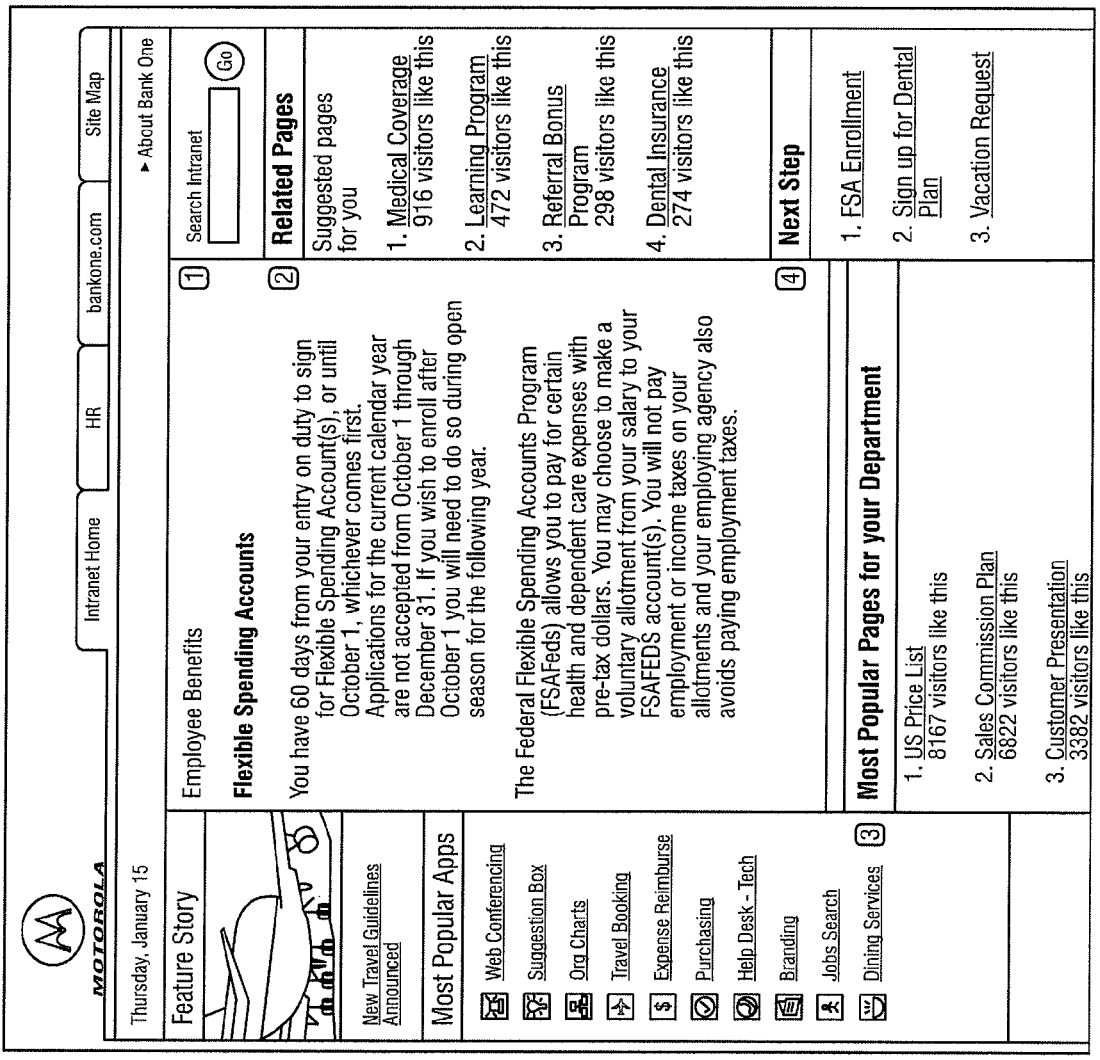

1. Social Search
   20x more useful content
   UseRank™ & Implicit Learning
   Intent Driven & Adaptive
   Implicit Folksonomy
   Works with Endeca, FAST, any engine
   Support Audio, Video & all Content Types 2. Related Pages
   Similar pages on the topic
   Proven by the past experience of peers
   Enables serendipitous discovery
   Filters out low value content 3. Most Popular
   Content with the greatest value
   Top applications within the company
   Specific to a department or cross company 4. Next Steps
   Where people go from here to meet goals
   Next step in a business process
   Next set of content to read

FIG. 20

"Head" recommendations
→ broadly interesting
→ broadly targeted

"Tail" recommendations
→ niche content
→ highly-targeted

FIG. 21

Years (6-12)
ars (13-18)
ool Connection
ting Style
ur Kids Healthy
ular Activities
out College
ds Preschool
Kindergarten
1st Grade
2nd Grade
3rd Grade
4th Grade
5th Grade What happens this year?

- Should Sports Be Required?
- The Road to College: Preparing your freshman for Applications
- Learn Like an Egyptian
- Do Afterschool Programs Give Students a Boost?

Topic: Confidence in my kindergartener

"Wow, Kim! Are you a great mom or what?! I am a Sister of a cutter and I most read | most searched | top rated most read Wondering what others found interesting? Check out our most popular articles.

1. Chickenpox
2. Toy Recall Update: Mattel Recalls 9 Million Toys
3. 20 Tips to Promote Positive Self-Esteem
4. Top 10 Signs of a Good Kindergarten Classroom
5. The Preschool Years (Ages 4 and 5)
6. Asperger Syndrome
7. 10 Signs of a Great Preschool
8. Phonics and Whole Language Learning a relief it is to hear that your daughter is accept..."

Topic: Cutting/self injury

"Hi Carlissa! I am a kindergarten teacher and I would love to give you some suggestions. Could you tell me a little more about your son? Is he in kinde..."

Topic: LEARNING HIS WORDS OR READINGB GET HIM UP SET you might also be interested in...

- Asperger Syndrome
- Asperger Syndrome: Symptoms and Parenting Strategies
- Asperger Syndrome: General Information and Across the Lifespan
- Asperger Syndrome: Some Common Questions
- Asperger Disorder
- Supporting Appropriate Behavior in Students With Asperger Syndrome
- Individualized Education Plans (IEPs)
- Pervasive erger Syndrome digg this | add to del.icio.us | share | comment | add to favorites | print Asperger Syndrome Source: The Nemours Foundation KidsHealth®
Educational Partner Asperger syndrome (AS) is a neurobiological disorder that is part of a group of diagnoses called "autistic spectrum disorders." The term "autistic spectrum" refers to a range of developmental disabilities that includes autism as well as other disorders with similar characteristics.

They are known as spectrum disorders because the symptoms of each can appear in different combinations and in varying degrees of severity: two children with the same diagnosis, though they may share certain patterns of behavior, can exhibit a wide range of skills and abilities.

As a result, general terms such as "low-functioning," "high-functioning," "autistic tendencies,"

*Socially-powered Search*

*Profit from Long-Tail search terms*

*10x more conversions over keyword-search*

FIG. 22 home | community | magazine | e-learning NEW! | e-tutoring NEW!

search results

Home > Search Results

Search [aspergers] [Education.com ▼] [SEARCH]

Education.com | Our Web Picks | The Whole Web

Showing 1 to 10 of 31

Asperger Syndrome
What is Asperger syndrome? What are the symptoms and treatment options?
Reference | National Institute of Child Health and Development

Some Common Questions
FAQ's on expression of Asperger Syndrome in boys vs. girls. Should the child be placed in school based on their academic or chronological level?.
Reference | MAAP Services for Autism and Asperger Syndrome

Symptoms and Parenting Strategies
Is Asperger syndrome the same as autism? Listed here are key features, social interactions, education and other helpful strategies.
Reference | MAAP Services for Autism and Asperger Syndrome

General Information and Across the Lifespan
Learn about Asperger syndrome, its diagnosis and clinical features. Also study the changes in AS child from preschool to upper grade level.
Reference | MAAP Services for Autism and Asperger Syndrome

Supporting Appropriate Behavior in Students With Asperger Syndrome
Understand the characteristics of Asperger's that may influence a student's ability to learn and function in the school enviorment.
Reference | Autism Society of America

Popular Content space shuttle  neil armstrong nasa tv  saturn venus  iss  jupiter nasa pluto  international space station mars  neptune moon  nasa pictures planets

NASA IN YOUR LIFE

TECHNOLOGY

NASA PEOPLE

NASA HISTORY

Careers @ NASA

*Most engaging "topics" right now*

*Drives content discovery*

*All implicit, no user tagging required* t Video

Video On Demand

TV Channel:

Education  Media y and its importance to the nation. > Read More

METHOD AND APPARATUS FOR CONTEXT-BASED CONTENT RECOMMENDATION

CROSS REFERENCE TO RELATED APPLICATIONS

This application claims priority to U.S. provisional patent application Ser. No. 60/954,677, filed Aug. 8, 2007 and is a continuation-in-part of U.S. patent application Ser. No. 11/319,928, filed Dec. 27, 2005 now U.S. Pat. No. 7,698,270, which application claims priority to U.S. provisional patent application Ser. No. 60/640,872, filed Dec. 29, 2004, all of which are incorporated herein in their entirety by this reference thereto.

BACKGROUND OF THE INVENTION

1. Technical Field

The invention relates to electronic access to information. More particularly, the invention relates to a method and apparatus for context-based content recommendation.

2. Description of the Prior Art

One problem with finding information in an electronic network concerns how people are connected as quickly and effectively as possible with the information/products/services that meet their needs. This has been one of the main goals of Web pages and search engines since the beginning of the World Wide Web. Failure to do so leads to lost business in the case of eCommerce eTravel, and eMarketing sites, frustrated customers on eSupport sites who likely then call customer support, thus wasting a lot of the company's money, disinterested viewers/reader on eMedia sites who quickly abandon the site, thus losing opportunities for advertising revenue, and unproductive employees on intranets.

Web site design is a manual attempt to solve the problem of information discovery: to organize information in a way that the designer imagines helps a user find what they are looking for. While effective in some cases, trying to find information in this way often is slow and ineffective as users resort to poking around a site looking for the information they need. Most users actually abandon a site if they do not find what they are looking for within three clicks. One problem is that the site is static. In more recent years, Web analytics has emerged as an attempt to alleviate this problem. Designers can see all of the actions that happen on their site and collect it into reports that aim to provide some guidance on how the site can be redesigned or reconfigured more effectively. While providing some benefit, the information provided is often ambiguous and provides only hints rather than concrete suggestions for improvement. At best, the process is tedious, requires a great deal of manual effort as designers redesign the site in line with learnings, and takes a long time. The feedback loop is thus slow and ineffective.

Automatic content recommendation is a completely different strategy that emerged very early in the life of the Web. Search engines, such as Google, Yahoo, and Ask, are the common manifestation of such techniques. The basic idea is that the user explicitly describes what they are looking for in the form of a search query, and an automatic process attempts to identify the piece of content, most often a Web page, that best matches their query. The approach for doing this amounts to looking at all possible documents and recommending those where the target query occurs within the text with highest frequency, i.e. keyword match. Modern adaptations of this basic technique add layers of sophistication, e.g. natural language processing, but the key in these approaches is still to use properties of the content itself, e.g. words within the document, to determine the ultimate relevancy ranking. This represents the first content-centric phase of content recommendation (see FIG. 1).

Many variations to this approach exist including, most notably, meta-tagging. In this approach, the content creator selects a small number of terms to describe the content. These terms are embedded within the content, often as HTML meta-tags, but are not necessarily made visible to the consumer of the content. This is one way to allow search engines to search content that is not text-based, such as video clips. This approach was very common in the late 1990's, but has since fallen out of favor due to the enormous effort required to keep the meta-tags up to date and in-synch with changes to the content.

In many ways, this first content-centric approach on the surface make a lot of sense, i.e. if you want to recommend content, consider the content itself. A key problem with this approach is that it often brings back lots of documents that may be relevant but not useful. Many documents may exhibit a strong keyword match, but are outdated or not truly relevant to the user's current interest. If users do not find a useful result within the first few results, they are most likely going to abandon the search.

Keyword match does not really reflect how we find information most efficiently in the real world. In day-to-day life, the best way to find the information/products/services we are looking for is to ask someone who knows to point us in the right direct. The second phase of content recommendation thus shifts the focus from content to users (see FIG. 1). Google's "PageRank" algorithm, though we place it in phase 1, was really a transitional technology that harkened the coming of phase 2. The page rank algorithm's break-through was to consider not only the content of the page itself, but how it had been linked to from other pages by other Web site designers. This represented a form of voting on the importance of Web pages. Thus, pages that were linked to more often were seen as more valuable. While bringing people into the equation, the people who were voting were Web designers rather than the consumers of the content, i.e. the users. Phase 2 of content recommendation is all about the users. The three most well known approaches that fall into phase 2 are: folksonomy, profiling/behavioral targeting, and collaborative filtering.

Folksonomy

The first, folksonomy, represents the most straight-forward addition to phase 1. Here, users are allowed to tag content themselves. So, rather than the Web site designers, or a single designer, being responsible for coming up with the best set of keywords to describe the content, folksonomy lets the community do it. Once this is done, those community created tags essentially become part of the content and can be searched using traditional information retrieval/search techniques developed in phase 1. A big assumption in this approach is that the subset of the community who takes the time to tag the pages explicitly, ultimately produce a description that is valid and representative of the larger community's opinion. This is often not the case.

Profiling/Behavioral Targeting

Profiling/Behavioral targeting in its common form also borrows heavily from phase 1 techniques. Here, based on a user's prior behavior on a site, e.g. the pages clicked or products purchased, a profile is built for that user. This profile may, in the simple case, be based on a collection of pages clicked or products purchased. The profile may also make use of the content itself or meta-tags to attempt to discern the user's historical topics of interest. For example, if a user purchased many films tagged as "horror" by content providers in the past, then a behavioral targeting system would tend to recommend more "horror" films to the user. A major assumption here is that a user's historical behaviors are a good predictor of future interest. While sometimes true, this assumption tends to fail at least as often as it works. The reason for failure is that people exhibit a variety of behaviors depending on their current interests, context, and goals. For example, someone who bought a few books on guitar as a one-time gift for his wife a few weeks ago, might continue to be recommended guitar books by a behavioral targeting approach, even though he may no longer have interest in that topic. Profiling approaches often also take into account demographic data of users, such as age, gender, and geographic location. The core belief underlying such approaches is: If I only knew enough about a user I could predict exactly what they want. However, some basic introspection uncovers the fallacy underlying this approach. For example, I may know more about my wife than any person or machine. I am in this way the ideal profiling system for her. However, I am unable to predict what she might be currently looking for online without some context.

Collaborative Filtering

Collaborative filtering is another user-centric approach which is arguably the most strictly user-centric. Here, users are compared to one another based on common purchases, click histories, or explicit ratings. For example, based on a person's previous ratings of movies on a movie site, find other people who most agree with that person's ratings and recommend other movies that he liked. Standard "people who bought this also bought that" approaches are actually a variation on the collaborative filtering approach, where a user's most recent action serves as the sole basis for identifying similar users. This approach was made popular by Amazon's recommendation engine. A big assumption in this approach is that some global similarity measure between users based on past behavior is a useful way to predict future interest. This is a flawed assumption, however. One may be very similar to some of his co-workers in a work context, e.g. they are all Java engineers, with similar interests regarding programming, but quite different from these co-workers when outside of the office, on the golf course for instance. In the context of golf, one likely has a very different peer group. Grouping users at a global level is more often misleading than helpful.

Another weakness in all of the user-centric approaches in phase 2 is the reliance on either explicit measures of liking or overly-simplistic implicit measures. Explicit measures include asking the user to indicate their liking of a particular piece of content, e.g. on a 1-5 scale. Such approaches are almost always biased because they represent a very small percentage of the population. Further, the people who are taking the time to do these ratings are not representative of the community as a whole. They tend to be very opinionated or reflect a specific personality type that is willing to spend the time to voice their opinion.

Those approaches that leverage implicit observations as a rule either look at clicks or purchases. Clicks are a flawed way to assess liking because getting someone to click on a result has a lot more to do with an intriguing, perhaps even ambiguous, title and location on page. It tells one nothing about how a user felt about the content once it is selected for viewing. At the other extreme, many systems use purchases as a measure of liking. While purchases are a reasonable way to assess this, they are too limited. For example, when buying a camera, one may seriously consider a number of products before making a decision. All of that information could be valuable to others interested in cameras above and beyond to the one ultimately purchased.

SUMMARY OF THE INVENTION

An embodiment of the invention represents Phase 3 in the evolution of content recommendation (see FIG. 1). Here, the idea is to start by understanding the current user's context, i.e.: What is their intent? What are they looking for? Based on this understanding, then find the appropriate peer group representing other users who are most like the current user in the context of this identified interest. From there, find the content that that peer group identifies as most relevant to the current context.

The approach taken in the invention is context-centric or, put another way, intent-centric. The techniques used to achieve this approach are described later and are fundamentally based on the UseRank technology and affinity engine described, in part, in U.S. patent application Ser. No. 11/319, 928, filed Dec. 27, 2005, which is incorporated herein in its entirety by this reference thereto. It should be noted that all previous approaches, including the content-centric and user-centric approaches, are subsumed and improved by the Phase 3 approach manifested in the invention. Because the invention adds the dimension of context to the picture on top of users and content, it is always possible to choose to ignore context and use the system to provide phase 2 functionality, such as collaborative filtering or behavioral targeting/profiling. However, even these previously known approaches are significantly improved in their functionality based on a critical aspect of the invention which provides full-spectrum behavioral fingerprints.

BRIEF DESCRIPTION OF THE DRAWINGS

FIG. 11 is a "Wisdom of Crowds" pseudo-equation;

Figure 13:
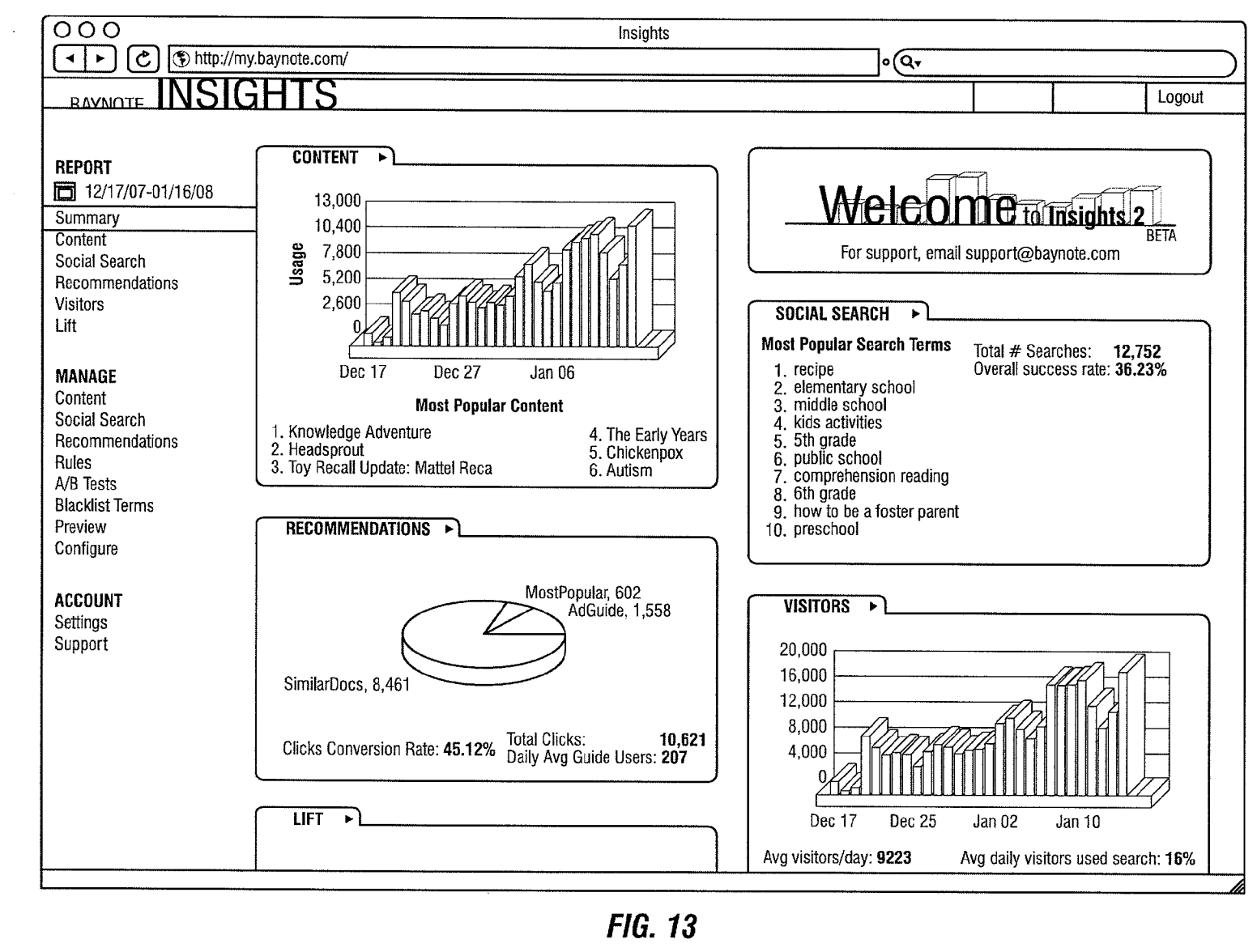

FIG. 13 is a screen shot of the welcome screen of the customer portal according to the invention;

FIG. 16 is a screenshot showing community-guided e-travel according to the invention;

FIG. 17 is a screenshot showing community-guided marketing according to the invention;

FIG. 19 is a screenshot showing community-guided online support according to the invention;

FIG. 20 is a screenshot showing a community intranet/knowledge portal according to the invention;

FIG. 21 is a screenshot showing community-guided media according to the invention;

FIG. 22 is a screenshot showing community-guided social search for media according to the invention;

FIG. 24 is a screenshot showing community-guided video recommendations according to the invention;

FIG. 25 is a screenshot showing community-guided topic recommendations according to the invention;

DETAILED DESCRIPTION OF THE INVENTION

Figure 1:
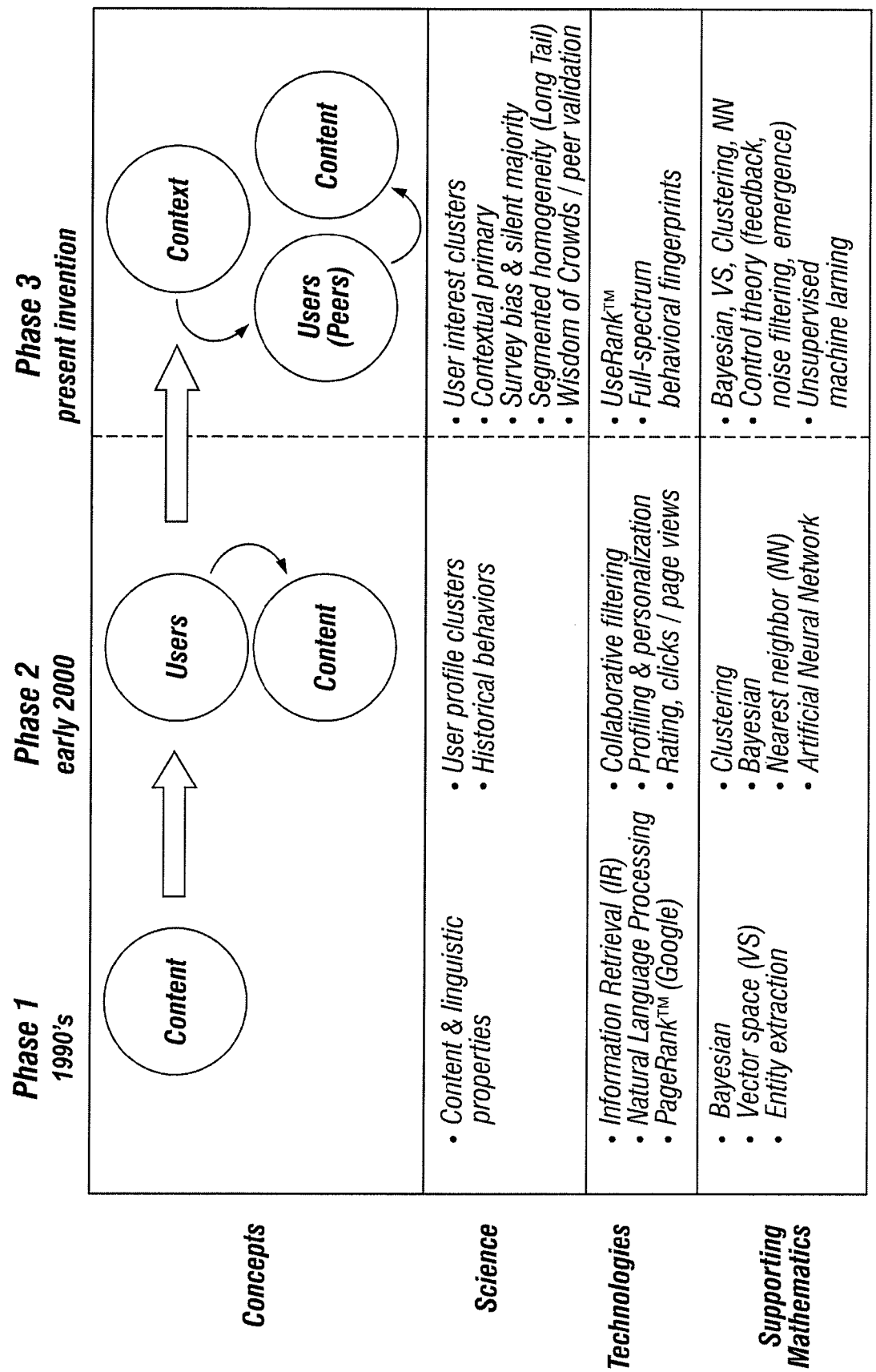
FIG. 1 is a schematic overview of the evolution of content recommendation leading up to the invention.

The invention represents Phase 3 in the evolution of content recommendation (see FIG. 1). Here, the idea is to start by understanding the current user's context, i.e.: What is their intent? What are they looking for? Based on this understanding, then find the appropriate peer group representing other users who are most like the current user in the context of this identified interest. From there, find the content that that peer group identifies as most relevant to the current context.

The approach taken in the invention is context-centric or, put another way, intent-centric. The techniques used to achieve this approach are described later and are fundamentally based on the UseRank technology and affinity engine described, in part, in U.S. patent application Ser. No. 11/319, 928, filed Dec. 27, 2005. It should be noted that all previous approaches, including the content-centric and user-centric approaches, are subsumed and improved by the Phase 3 approach manifested in the invention. Because the invention adds the dimension of context to the picture, on top of users and content, it is always possible to choose to ignore context and use the system to provide collaborative filter, profiling. However, even these previously known approaches are significantly improved in their functionality based on a critical aspect of the invention which provides full-spectrum behavioral fingerprints.

Figure 2:
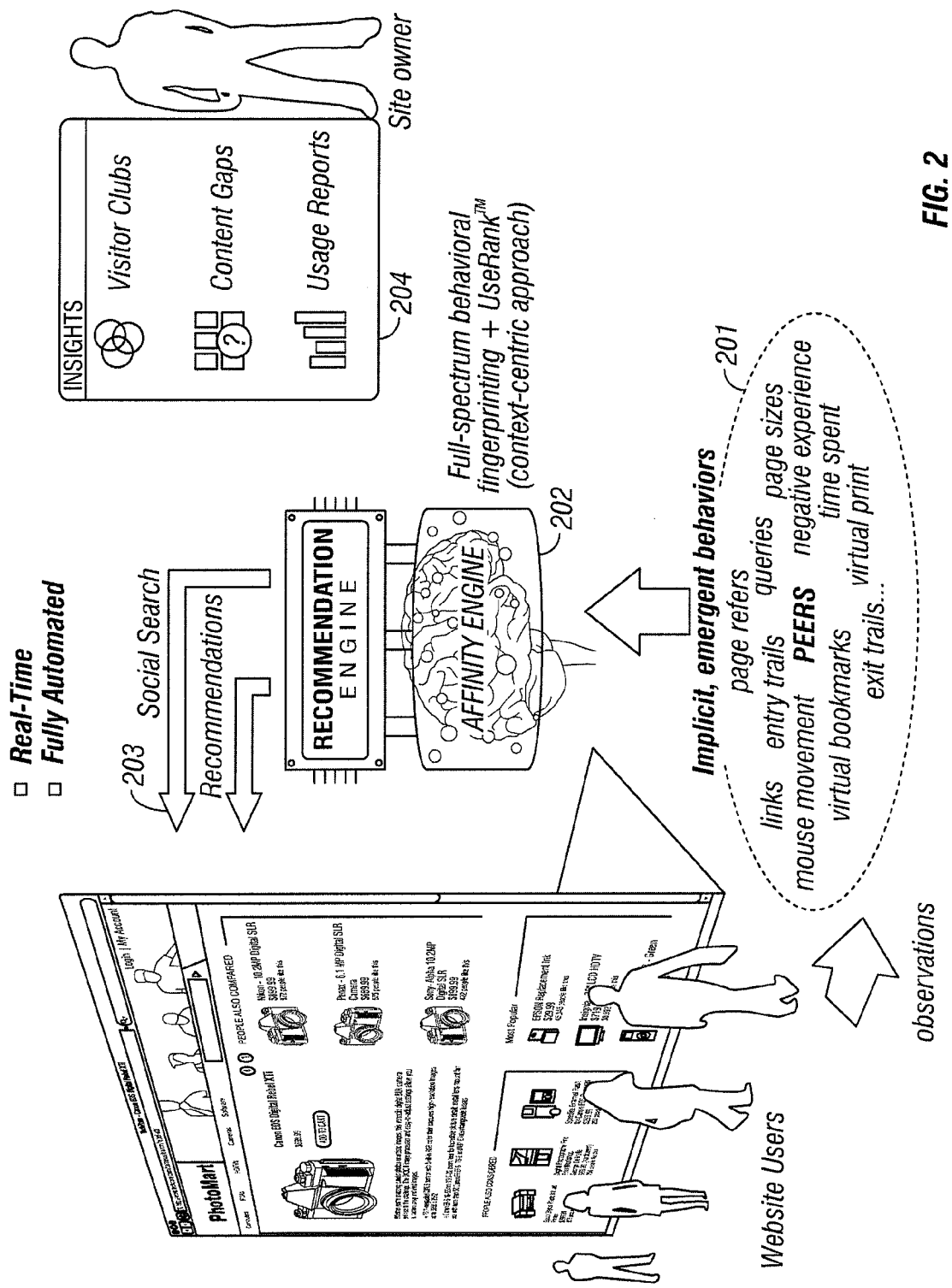
FIG. 2 is an architectural schematic diagram showing a method and apparatus for context-based content recommendation according to the invention.

FIG. 2 is an architectural schematic diagram showing a method and apparatus for context-based content recommendation according to the invention.

Full-spectrum behavioral fingerprints provide a significant advancement over current state-of-the-art implicit ratings, which essentially amount to click analysis and purchase behavior. First, they take into account a wide variety of user behaviors including, but not limited to, clicks, time spent on a page, scrolling and mouse movement, explicit actions such as print, email, bookmark, links used, frequency of return visits, and searches performed. Second, all of these behaviors can be cross-correlated with the current user's behaviors on other pages, and also with the rest of the community's and identified peers' behaviors on the current page. From this analysis, a probability that the user has found value in a particular piece of content can be discerned and fed into the learning system.

A further aspect of the invention concerns the seamless integration of existing strategies for automatic content recommendation (see FIG. 3), including search engines 301 and profiling systems 302, and ad servers 303, as well as systems for manual recommendations including merchandising rules and systems 304. The invention also seamlessly integrates with other information sources related to the content, such as product catalogs 305, which can be used for purposes of display, filtering, or learning.

Figure 5:
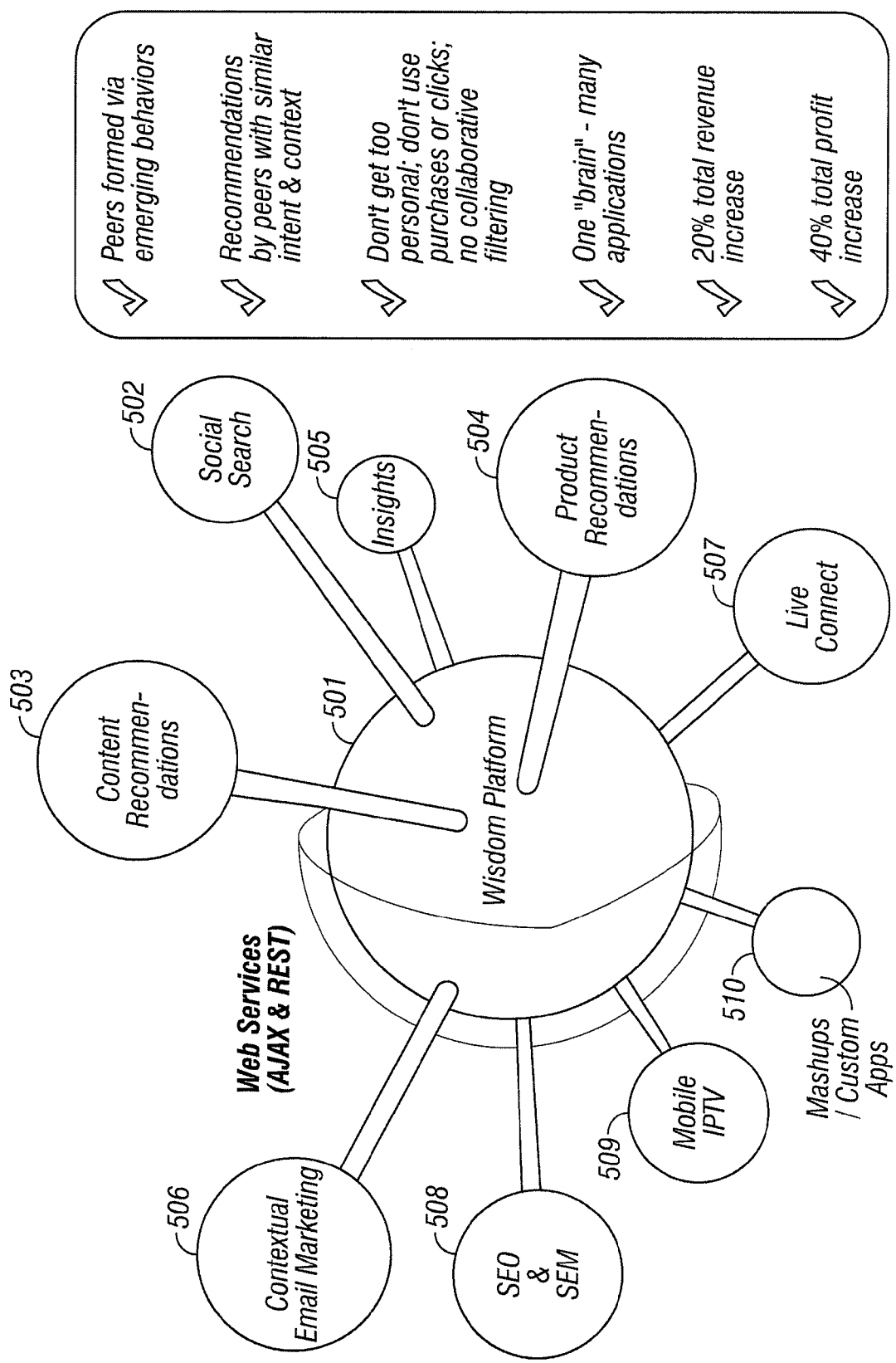
FIG. 5 is an architectural schematic diagram showing a community wisdom platform according to the invention.
Figure 6:
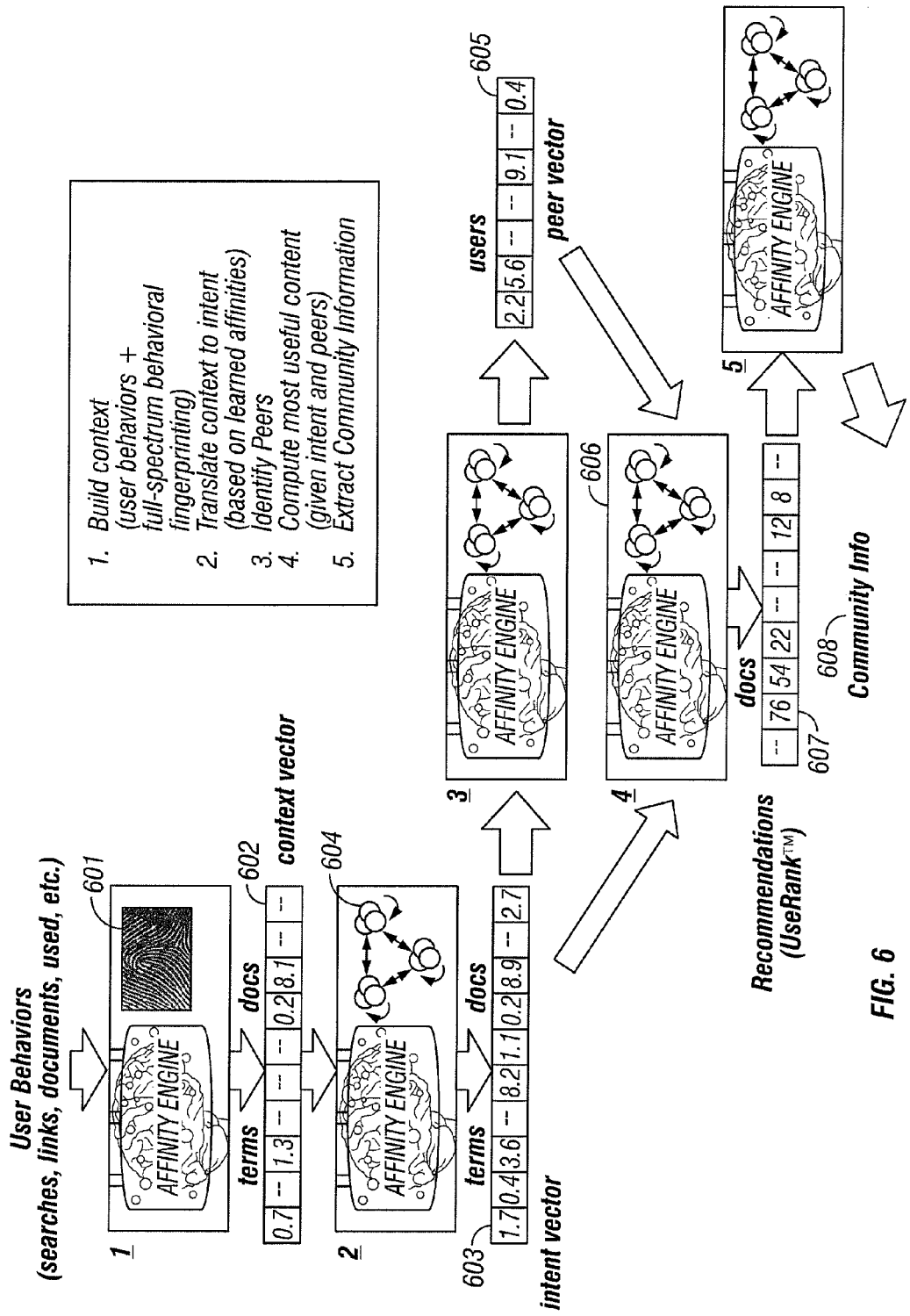
FIG. 6 is schematic flow diagram showing the process of translating context to recommendations.

Finally, because of the comprehensive nature of the information collected and the learned affinities, the system represents a general wisdom platform 501 on top of which many applications can be built (see FIG. 4 and FIG. 5), such as SocialSearch 502, Content 503 and Product 504 Recommendations, Insights 505, eMail 506, and Live connect 507 which are tailored to various applications, e.g. eCommerce, eMarketing, etc. Additional applications include reports and integrations with bid management systems for search engine optimization and search engine marketing 508, mobile and IPTV 509, and custom applications or mashups 510. Some of these applications are described later. Each of these critical aspects are now described in greater detail Context- and Intent-Centric A core advancement in the evolution of content recommendation embodied by invention is the process for identifying and representing the users current topic of interest and converting that interest into a set of useful recommendations and information. The steps in this process are shown in FIG. 6 and outlined below:

Step 1: When a user comes to a Web site, they immediately begin to establish their current context. They might do this by entering a query into a search box on the site, navigating to a particular section, or may even have established some context before arriving at the site by doing a search on an external search engine, such as Goggle or Yahoo, that led to this site. All of this information is captured by an Observer Tag, i.e. a piece of HTML/JavaScript embedded in the Web site. As the user continues to move through the site, they may also show interest in a particular page or piece of content, based on their implicit actions. Interest is determined based on various behaviors collected by the Observer Tag and analyzed using the invention's Full Spectrum Behavioral Fingerprint technology 601 (described in greater detail below). These pages of interest further contribute to the user's context.

All of this information is stored as the user's current context vector 602, which is a hybrid vector of terms and documents with weights on each entry reflecting how strongly that term or document reflects the user's current context. As a user enters search terms and/or clicks navigation links, the vector entries corresponding to the terms and phrases entered or clicked are incremented to capture expressed interest. As these actions move further into the past, the corresponding entries are decremented or decayed. Similarly, documents that a user clicks on or indicates interest in, as determined based on their implicit actions, increment the corresponding vector entry to a degree based on the level of interest and level of certainty determined by the invention. The result is a representation of the user's current context as a context vector. It is also possible to increment the context vector further, based on historical actions and historical contexts of interest of the user. Although this is not generally done in the preferred embodiment because such information can be misleading, it is possible to increment the context vector to a lesser degree based on these historical contexts in applications where historical behavior is considered to be relevant.

Step 2: Expand and refine the context vector into an intent vector 603, based on affinities/associations learned from the aggregated wisdom 604 collected from observations on the community as a whole over a longer term. For example, the user may have entered a query about digital SLR cameras and expressed implicit interest in a Nikon page. In the context vector, the entries corresponding to "digital SLR camera" as well as "digital," "SLR," and "camera" to a lesser degree are incremented, as is vector entry corresponding to the particular Nikon page of interest. To create the intent vector, the system looks at affinities between the terms and documents in the context vector to other terms. For example, the community wisdom may have discovered that the term "high-resolution" may be highly associated with both the term "Nikon," as well as with the specific Nikon page of interest. The intent vector is thus incremented at the entry corresponding to "high-resolution." Similarly, other documents that are associated to the terms in the context vector may be discovered based on the community wisdom and are incremented in the intent vector. For example, a Canon camera page may have strong affinities to "SLR camera" and become part of the intent vector to some degree. The affinities 604 that allow the expansion of the context vector into an intent vector are determined by the affinity engine which is described below and in detail in U.S. patent application Ser. No. 11/319,928, filed Dec. 27, 2005. In summary, the affinity engine learns connections between documents and terms, documents and documents, terms and terms, as well as users to other users, documents, and terms by watching all of the implicit behaviors of the user community on the site and by applying behavioral fingerprinting and the use rank algorithm to determine interest and associations. The ability to translate context into intent effectively is a key aspect of the invention.

Step 3: Identify the group of users who share affinity to the current intent, as well as those users who exhibit behavior most like the current user within the context of that intent. In U.S. patent application Ser. No. 11/319,928, filed Dec. 27, 2005, these are called "experts" and "peers" respectively, but here we combine them both under the name "peers." This peer group is represented by a user vector 605 and each user entry in the vector may have a weight indicating how strong of a peer he is to the current user in this context. Although not generally recommended, the system is also capable of limiting the peer group to those users who match the current user based on a set of predefined attributes, such as age, gender, location, or other demographic variables. Similarly, the peer group can be limited to those users who visit the site at the same time of day, e.g. morning, afternoon, evening. In some cases these attributes can be used to influence the peer weights for users, such as giving slightly more peer weight to those users who also best match the user along these predefined variables. The invention can also learn these weights by comparing behavioral patterns, e.g. documents found useful in the simplest case, within and across each of the predefined attribute groups. Higher intra-group similarity in behavior compared to inter-group similarity indicates the group is differentiated and thus a higher weight of influence for groupness is warranted when influencing the peer group. Similarity can be measured by looking at similarity of documents and terms used through one of many similarity calculations, e.g. cosine similarity, on users' aggregated interest vectors.

Step 4: Look at which documents have highest affinity to the identified peers within the current intent 606. To do this the affinity engine looks at a combination of factors, including the overall usefulness of a piece of content, as represented by the activeness vector, learned affinities between terms and content, as represented by term-doc matrices, and predicted navigational patterns, as represented by next-step matrices, associated with those peers the factors are weighted according to their peer weight, and used in aggregate to compute those documents with highest affinity to the current intent. These documents become the unfiltered recommendations 607. Filtering, described in greater detail below, may now be applied to limit or augment those community recommendations.

Step 5: Now that the recommendations have been identified and appropriately filtered, a final optional step is to ask the affinity engine for community information on each of the recommendations 608. This information can be combined with other asset information, such as title, size, or price, and displayed to the user to help them understand the community wisdom underlying a recommendation. Many aspects of the community wisdom associated with a document in the affinity engine can be exposed, but in common implementations we expose the number of users in total who found value in the document, the number of peers who associated the document with the current context/intent, and the terms/phrases the peer community has associated with the document.

Figure 7:
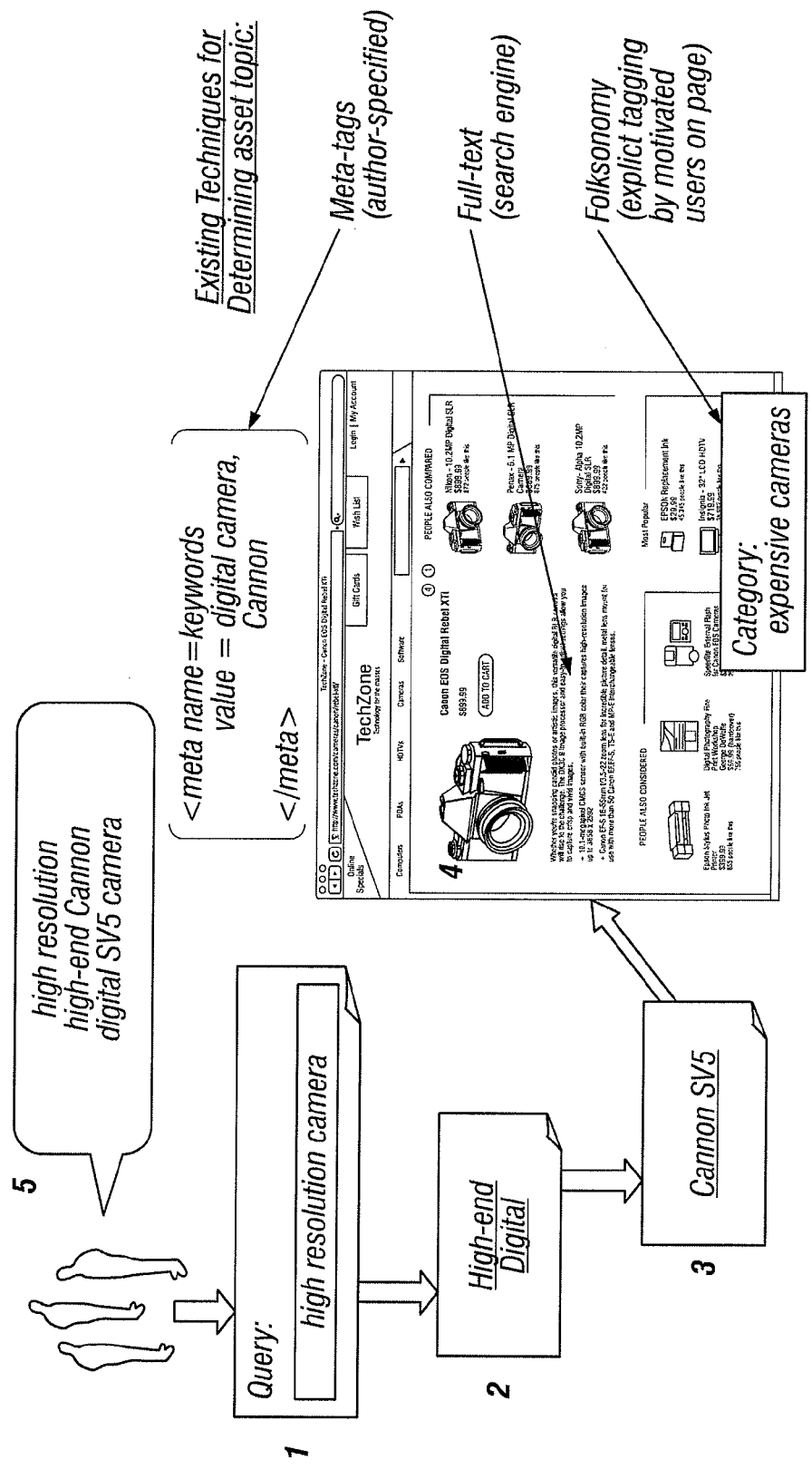
FIG. 7 is schematic flow diagram showing the process for achieving a virtual folksonomy according to the invention.

This latter piece, i.e. terms associated to the document, is called a virtual folksonomy because it represents terms that the community has associated to the document, but unlike a traditional folksonomy, discussed above, where users must explicitly make the associates, the virtual folksonomy is created automatically by the affinity engine based on the implicit actions of the user community. Terms that are searched or clicked as navigation links and lead, within one or more steps, to useful content, as determined by behavioral fingerprinting, become automatically associated. These term-doc connections are both fundamental to the process of providing recommendations, as well as providing useful feedback to users on the topics associated with each recommendation. When these terms are displayed to a user, they can be made clickable so that the user can click them to provide further input regarding their current intent. This information then becomes part of their context vector, the whole process repeats, and new recommendations may be provided based on this new information. FIG. 7 provides a conceptual diagram of a virtual folksonomy, contrasted against traditional approaches for connecting terms to content.

Time (Decay, Trend, and Fad Detection)

Time factors in heavily to all computations in moving from context to recommendation. First, all information collected by the affinity engine is subject to time decay. This means that, for example, information from last month has less of an influence on the calculations than information from today. This is important because the site may change, e.g. new content added or removed, people may individually change, e.g. their interests may change, and the community as whole may shift interest, e.g. new fads. Although there is a default decay rate for all information, some information may decay away more rapidly if it is determined that this is necessary. For example fad behavior, such as interest in Christmas products that come and go quickly, may need to be decayed more quickly to prevent recommending Christmas products too long after Christmas has passed. To prevent this, the system runs a trend detection system across all content on a periodic basis, e.g. once a day, or every five minutes for very time-sensitive sites. Trend detection can be done in a number of ways, but one way is to use the Mann-Kendall algorithm. Other ways include various regression techniques that employ least-squares fit. If a strong negative trend is detected for a given piece of content, the information associated with that content in the affinity engine is decayed at a more rapid rate. The result is that the likelihood of the affinity engine recommending this piece of content is reduced.

Another algorithm for fad detection that is run on a periodic basis is cyclical fad detection. If a piece of content shows a strong positive trend and that same trend can be found at regular intervals in the past, then that piece of content can be automatically boosted in importance in anticipation of the coming trend.

In a traditional Web site, even where the site proprietor is trying to understand customer behaviors, techniques that are typically used survey the customer and analyze the customer responses to produce a report. By the time the report is analyzed, the results of the report are out of phase with the actual situation at the time the report is being reviewed. For example, in a traditional system, a commerce site might collect feedback during the Christmas season and redesign their site in February in response to that information. In effect, the commerce site is trying to sell Christmas products in February. Alternatively, analytics reports may be created offline and analyzed by a team of specialists to infer trends and determine appropriate actions; a process which may take weeks or month and again lead to out-of-date site modifications. In this way, the automatic nature of the invention herein allows a Web site to adapt in real-time to discovered trends and fads, providing recommendations to users that fit the current context and time.

In addition to contributing to the process of automatic content recommendation, however, the trend and fad detection algorithms used by the invention can also be exposed to owners of the content system, e.g. the Web site, through reports within a customer portal. In the preferred embodiment, such reports on community trends and fads can, for example, be used by merchants to promote certain products or content at the right time, making such promotions more effective. Given the example of products that are sold during the Christmas season, if such sales were to die out after Christmas, then the proprietor of the commerce site would be able to follow the sales curve based on community interaction with the Web site. If, on the other hand, an emergent news story drives demand for a product quickly, the invention allows the merchant to watch the curve of demand and respond in real-time. Thus, if people are all of a sudden dramatically interested in a particular piece of content or product, the proprietor of the Web site can provide that content or product more quickly. If the demand dies out quickly, for example the interest was based on a fad, then the proprietor of the site can adjust to that fact as well.

Affinity Engine

As already mentioned, and as discussed in greater detail in U.S. patent application Ser. No. 11/319,928, filed Dec. 27, 2005, the affinity engine learns connections/affinities between terms-documents, terms-terms, terms-users, documents-documents, documents-users, and users-users. (Note: the terms document, content, and asset are used interchangeably throughout this document. In all cases, these terms refer to any type of medium that provides information or services including, for example but not limited to, webpages, word documents, pdfs, video, audio files, widgets, and/or products). In the preferred embodiment, all affinities are stored as sparse matrices and vectors. However, there are many alternative ways of storing such information known to those skilled in the art. Although there is ultimately a single number that can be calculated to represent the affinity between any two entities, e.g. a document and term, there are usually several sub-affinities that are combined in a weighted sum to arrive at that single number. The weights on that sum may be dependent on context. For example, documents have at least three kinds of affinities to other documents: similarity in virtual folksonomy, i.e. terms the community has associated to the documents; similarity in user groups, i.e. how many users have used both documents; and similarity in navigational patterns usage, e.g. do users show a pattern of finding value in one document after using the other. A variety of mathematical techniques are available to be employed as appropriate to each kind of data, although a combination of vector space models and custom probabilistic techniques are currently used by the preferred embodiment of the invention. See U.S. patent application Ser. No. 11/319,928, filed Dec. 27, 2005 for more discussion.

Figure 8:
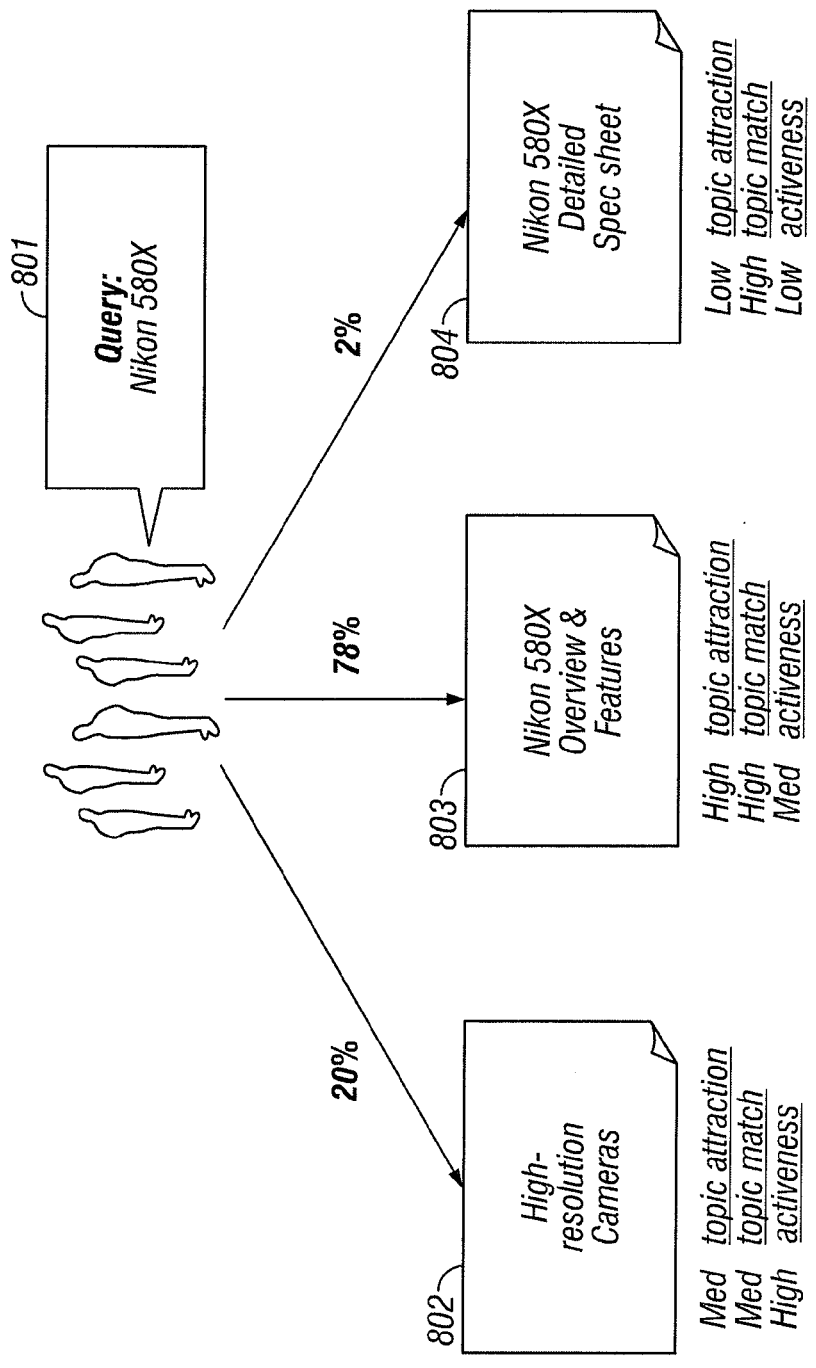
FIG. 8 is a schematic diagram showing topic attraction, topic match, and activeness according to the invention.

One important aspect of the invention is that all sub-affinities are always computed bi-directionally. To illustrate this bidirectionality, we describe its application to the term-document sub-affinity derived from the virtual folksonomy. FIG. 8 is an architectural diagram showing the aspects of the invention that involve topic attraction and topic match, the two dimensions that make up the bidirectional virtual folksonomy connection between terms and documents, as well as general activeness. In the example of FIG. 8, a query is provided 801 and a percentage of respondents who ultimate find value in one of three example documents are indicated. The query involves a particular Nikon camera and it can be seen that 20% of the respondents find value in a Web page focused on high-resolution cameras 802, 78% found value in the overview page for the specific camera 803, and only 2% of users making this query found value in the detailed specification sheet for the camera 804. As a side note, remember that value is determined by the full spectrum of behaviors exhibited on a given page by the user (described in detail later).

There are two ways to consider the virtual folksonomy connection between the query and each example document. Topic attraction starts from the query and considers the proportion of users who searched for "Nikon 580X" and subsequently found value in each document. In this example, the Overview page 803 has highest topic attraction, with 78% of users finding value there, followed by the High-resolution camera page 802 with 20%, and then the spec sheet 804 with only 2%. Note that this example is simplified for the purposes of illustration. In reality, we also break down the query into its component parts and consider the affinities of these to each document, as well as consider affinities between other terms that the affinity engine has learned have similar meaning to this one. In this way, topic attraction can be thought of as a problem of predicting the probability that a user finds value in a given document, given the intent represented by the query. In the preferred embodiment arriving at this probability is accomplished using a combination of probabilistic techniques, including Bayesian inference.

Topic match looks at it from the other direction starting from each document and considering all of the other terms that have been associated with it through the behaviors of other users. So, for example, the High-resolution camera page 802 may have many other camera names connected to it and, thus, the degree of focus on the particular query entered is lower than both of the other two pages, whose term-document connections are more highly concentrated around "Nikon 580X" specifically. In fact, the Spec-sheet 804 may turn out to be the document with term connections most focused around "Nikon 580X" and thus have the highest topic match for this query, even though it has the lowest topic attraction. As with topic attraction, in reality, topic match also breaks down the query into its component parts and takes into account affinities between other terms not in the query. In this way, topic match can be seen as finding the document with the best overall match in topic to the intent represented by the query. In the preferred embodiment, a vector space model and modified cosine similarity technique, similar to that used by traditional full-text search, is used to determine the degree of matching.

These two directions of considering the affinity of each document to the query, i.e. topic attraction and topic match, are combined in a non-linear weighted sum along with the final factor of overall activeness i.e., usefulness, to arrive at a value for the virtual folksonomy sub-affinity. This sub-affinity is then combined with other sub-affinities, such as those based on navigational patterns, and filtered through the lens of peer groups, to arrive at an ultimate ranking of documents against the query, called UseRank. Similar bidirectional techniques are used to compute UseRank when providing recommendations on a particular Web page, and when considering the full context and intent vectors.

There are several methods for combining the various sub-affinities and the bidirectional dimensions therein to arrive at the ultimate UseRank of documents for a particular user and context. In the preferred embodiment, one or more thresholds are applied to each dimension, including absolute and relative thresholds before they are combined together based on hybrid arithmetic-geometric weighted average. Each resulting sub-affinity is then similarity subjected to a thresholding before being combined with other sub-affinities again based on hybrid arithmetic-geometric weighted average. The values for the thresholds are generally fixed, however, the individual weights for the weighted averages can also be adjusted and learned based on the success of the result set returned by the affinity engine.

Full-Spectrum Behavioral Fingerprints

As discussed herein, a key feature of the invention is the processing and analysis of implicit observations that are made during the actual use of a Web site, for example, versus traditional approaches in technology which use explicit feedback. One key advantage of the invention, as confirmed through scientific studies, and as understood from human psychology and sociology, is that humans are very bad at giving feedback, particularly if the feedback must be given explicitly. If a person is being surveyed, the person does not have an incentive to give actual accuracy in the form of feedback. One aspect of the invention eliminates such survey bias by using the implicit behaviors observed during use of particular materials on the Web by individuals within a community. Thus, the invention trusts what people do but does not watch what they say. The invention watches people's behavior through their actual action, implicit behaviors, and can accurately interpret what their true intent is and whether or not they dislike or like something. Thus, the invention observes behavior versus click actions.

Current technologies focus on clicks, such as Web link clicks. If a person clicks on a link, that click is reported. The click may be reported as having resulted in a viewed Web page, even though not much time is spent on the page on which the person clicked. Thus, this known approach is not a good indication one way or another if the page is good or bad. If a link is put in a prominent position on a Web page, then people are likely to click on it. However, when people get to the location indicated by the link, they may immediately leave the site. This is why the number one used button on the browser is the BACK button. The use of the BACK button could indicate like or dislike of a site. Accordingly, the invention recognizes that it is the action of the user after the click that matters and not the click itself. The invention tracks behaviors beyond the click to determine whether a page is good or bad. Thus, if a person backs out of the page, it is considered negative feedback, i.e. the person did not like it. In this way, clicks can identify a very negative reaction in the invention. If a person goes to a link, follows the link down, spends time there, and does other things, that behavior is tracked as well. If a peer group validates the behavior as consistent, e.g. a significant number of the group members exhibit the same behavior when reacting with the page, then the page is considered to be a good page.

An embodiment of the invention goes one step farther. Not only does the invention determine which assets are useful based on behavioral fingerprinting, but it also learns the context associated with the usefulness. For example, the invention can learn that a particular camera page is very useful for users that show interest and intent in high definition cameras, but not if the intent is compact cameras. In this way the affinity engine is able to distinguish the usefulness of assets based on the context and intent expressed by a user through their implicit actions.

Figure 9:
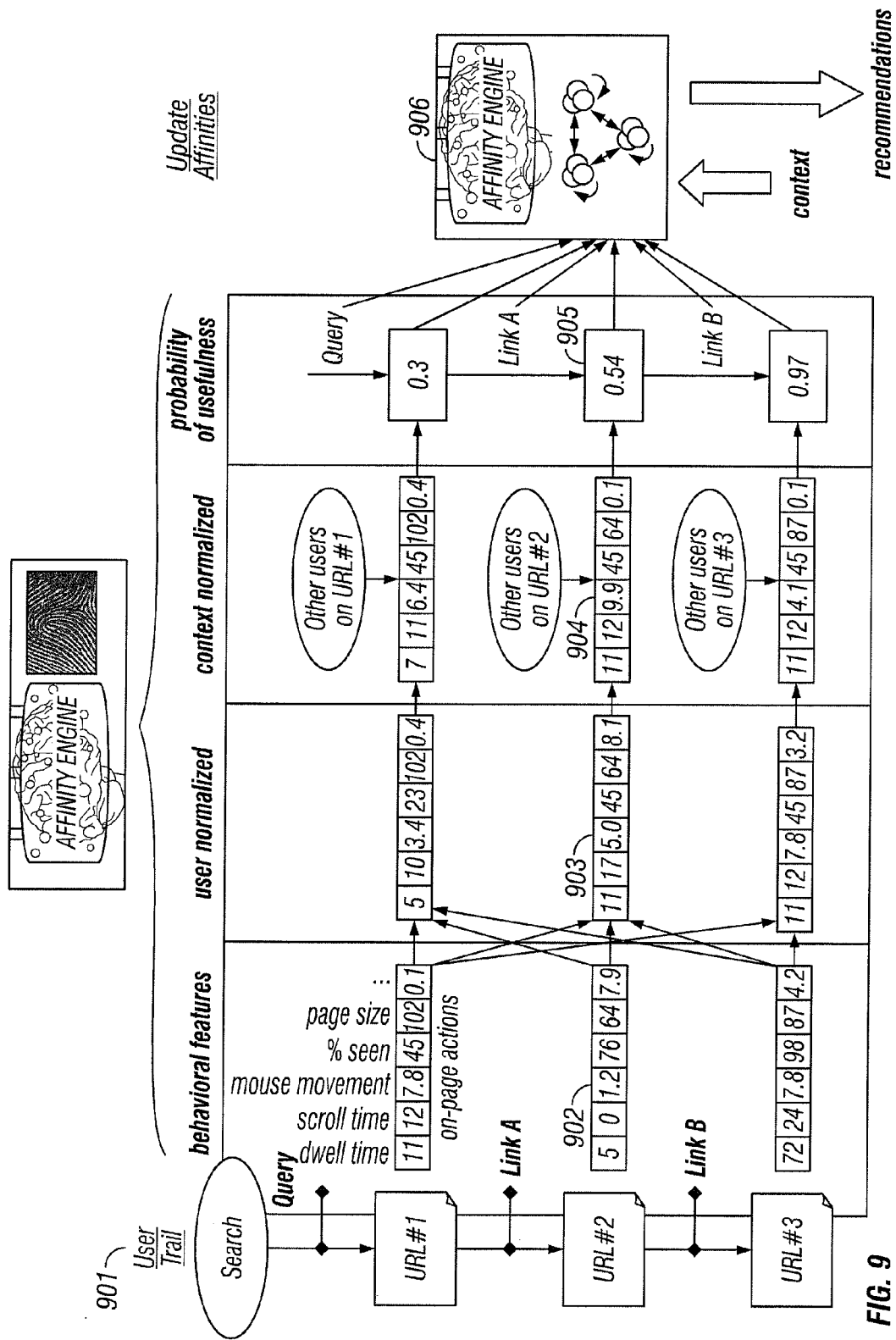
FIG. 9 is a schematic flow diagram showing the behavioral fingerprinting process according to the invention.

The primary input to the affinity engine, which drives all of the learned associations (affinities) is the behaviors of users on the site. In the preferred embodiment, all behaviors are captured by the ObserverTag, i.e. a piece of HTML/JavaScript embedded within the Web site, typically in a header or footer template. Although this is the preferred method for capturing user behaviors, it is also possible to capture user behaviors using a browser plug-in or lower-level network traffic analyzer. The behaviors captured include:

Pages visited and in what order
Time spent on each page
Links clicked
Searches performed
Time spent scrolling on a page
Portion of page visible in the browser window, and for how long
Page sub-elements opened/closed
Media launched, time spend viewing that media, and explicit action taken on the media
Use of the back-button
Repeated visits to a particular piece of content
Mouse movement while on the page
Ads viewed and Ads clicked
Explicit actions, e.g. Add to Cart, Purchase, Email, Save, Print, Print Preview
Virtual Print: content returned to frequently over the course of several hours or days
Virtual Bookmark: content left open over multiple hours or days with intermittent periods of activity
Entrance and Exit paths The captured information is send back to the affinity engine for processing. FIG. 9 shows the process for analyzing these behaviors or other implicit data captured from various user interface devices. The input to this process is the user trail 901 which includes all assets visited and the implicit (and explicit) actions observed on those assets. There are two main steps in processing the behaviors that combine to provide an understanding of what content is useful and in what contexts. The first step is determining whether a user is finding value (usefulness) in a particular piece of content. Conceptually, the more time spent on the page in think mode, i.e. user is processing the information, the higher the likelihood that it is useful. Think mode can be approximated by non-scrolling time on a page, where some scrolling or mouse-movement has been detected with a specified time range. Repeat visits and percentage of page seen are also generally good indicators of liking or usefulness. For each user and piece of content, we can create a behavior vector 902 with each entry in the vector representing one of the features listed above or a predefined combination of features. However, not all content is created equal nor are all users created equal. We normalize the behavior vectors in a several ways. First, we normalize by user to make behavior vectors comparable to the rest of the user population 903. For example, some users may read slower than others, affecting their mean time spent on a page. Some users may use the mouse more than others. One way to accomplish this normalization is by translating all entries into z-scores which adjusts for means and standard deviations specific to that user.

A second normalization is to normalize based on the content. This is done based on inherent or specified properties of the content. For example, 30 seconds spent on a one paragraph document likely has a different meaning than 30 seconds spent on a ten page document. Dwell time can thus be normalized based on page length or number of words. Similarly 30 seconds spent viewing a 30 second video has a different meaning than 30 seconds spent viewing a five minute video. In many cases the Observer Tag is capable of capturing these page characteristics through information within the DOM (Document Object Model). However, when not available in the DOM, the invention provides other mechanisms for collecting the needed information from offline catalogs, e.g. a product or media catalog, or allowing the Web site designer to add explicit information in the page itself, e.g. as meta-tags or added JavaScript variables. For example, on an e-commerce site, certain pages may be defined as information versus product pages. The system can normalize the behavior vectors for each of these content groups independently. In this way, the dwell time necessary to indicate liking can be adaptable to the type of content. All behaviors (features) can be made adaptable in this way. In the current implementation, these normalization strategies are hard-coded. However, the invention allows the possibility for plugging-in various machine learning techniques to learn the appropriate normalizations.

We now have a behavior vector normalized to the user and the content 904. In the current system, a predefined set of rules are applied to determine whether this behavior vector represents liking/usefulness. Each of the normalized features, in turn, is considered to determine whether it meets the pre-specified thresholds for indicating usefulness. Each passing feature increases the probability of usefulness 905. In some cases, the thresholds for a given feature are pre-specified and tuned by the person implementing the system based on previous experience. In other cases, these thresholds are dynamically determined by the system. For example, certain features are known to exhibit a bimodal distribution and the threshold can be dynamically determined to lie between the two modes. The invention also provides a mechanism for plugging-in various machine learning techniques to learn which features are most important, and thus dynamically learn the rules for converting from the behavior vector to the probability of usefulness.

Once usefulness, or probability of usefulness, has been determined, the second step in the analysis of behaviors is to understand the entire context surrounding the use of that piece of content, including searches done prior to the use, links clicked prior, and pages used prior. All of this information combines with information about the user to influence affinities 906 (affinities can be learned and stored in a number of ways, described in more detail in U.S. patent application Ser. No. 11/319,928, filed Dec. 27, 2005). Before doing so, however, there is one final step: validation. Validation is a form of noise filtering wherein an affinity connection is established, e.g. between a document and term, if and only if enough similar users have, through their behaviors, confirmed this connection. One user making the connection is not enough for an affinity to emerge. A minimum number of users in the same context (peers) must have exhibited similar behaviors and connections for that affinity to be validated. We call this peer-validated behavior.

UseRank™

UseRank™, the ultimate ranking of the usefulness of content based on a user's context and intent, based on learned affinities and full-spectrum behavioral fingerprinting, can be compared to the very popular PageRank strategy made famous by Google. In PageRank, each Web page is given a value based on the number of other pages linking to it. In addition, links coming from pages that are themselves of high value raise the PageRank even more. This democratic strategy is quite effective in getting users to useful Web sites based on their Google query, but generally breaks down once the user begins to look for further information within the Web site itself. The main reason for this is that pages within a Web site, particularly those down into the long tail of content, are not heavily linked to either externally or internally. Internally, the linkages are determined solely by the structure of the Web site and more links does not necessarily mean more value. In addition, many of the pages on such sites are in formats other than HTML, e.g. PDFs, Word Docs, or videos, and do not link to other content at all.

The UseRank methodology, based on user behaviors on the Web site alleviates all of these problems. Instead of relying on the linking of documents by Web designers, it relies on usage of documents by Web users, who are a rich source of information on any Web site. Usage is a truly democratic way of learning what content is most valuable. In fact, the designers of PageRank recognized their approach as an approximation of user activity. Google's choice to approximate user value based on PageRank makes sense given the privacy concerns associated with tracking a user's behavior across the entire Web. In the preferred embodiment of UseRank, we track only the behaviors of user's on sites instrumented with the Observer Tag, and always in an anonymous fashion unless otherwise configured by the Web site deploying the Observer Tag.

Long-Tail

Figure 10:
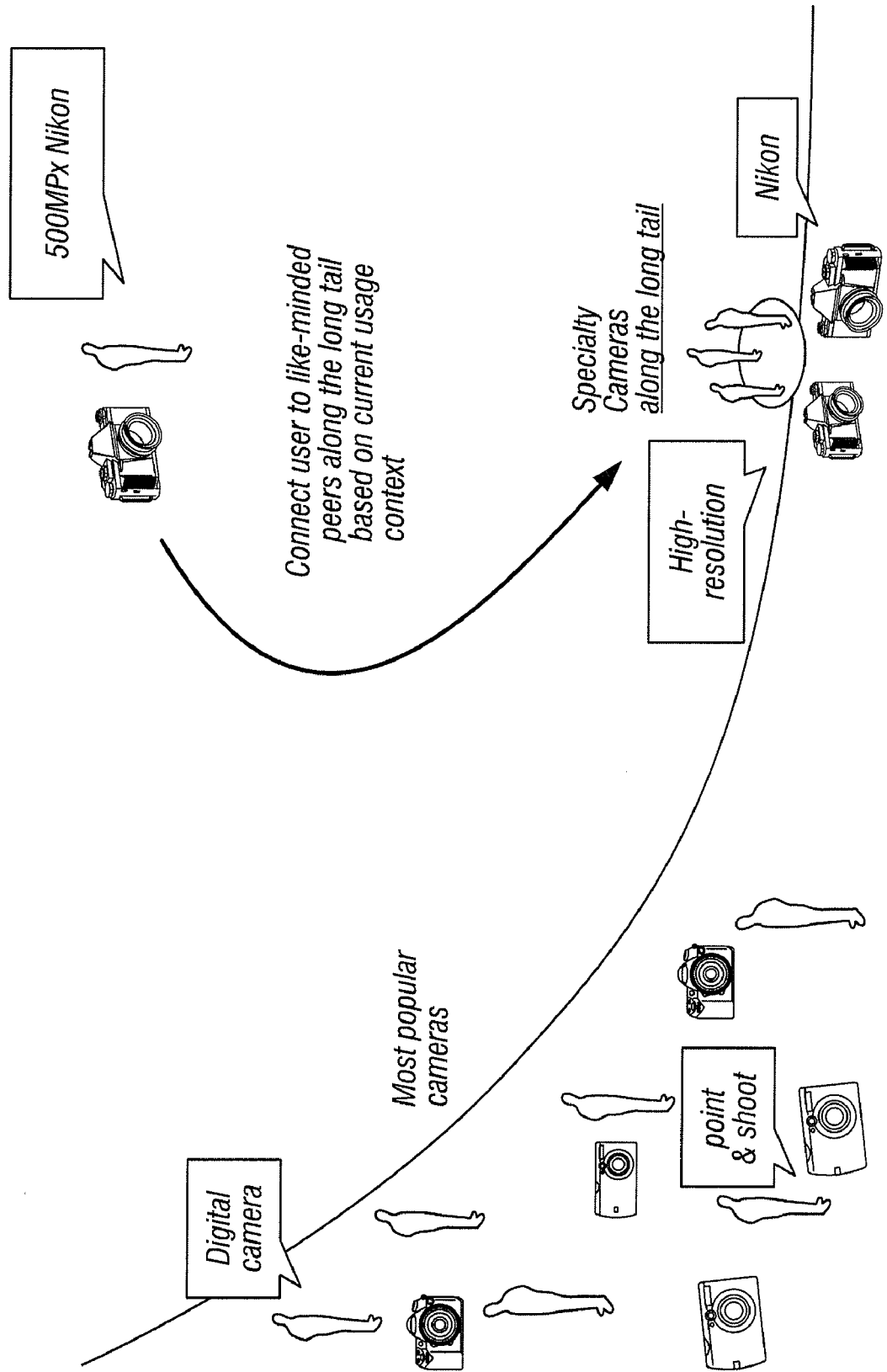
FIG. 10 is a graph showing a long tail marketing model with an architectural overlay according to the invention.

Another important aspect of the invention emerges from the context-driven approach underlying the affinity engine. Many previous systems that are content-centric or user-centric suffer from a problem where only the most popular product/content is ever recommended. Because these systems lack a deep understanding of the user's current context/intent, this is the best that they can do. The invention provides a context-centric approach that allows the affinity engine to narrow its focus to the subset of users (peers) and content that match the current user's context/intent, even if that intent is not particularly popular in the grand scheme of things. This is what is known as the long tail of the products, i.e. those products that may not be the most popular overall, but are extremely important because they strongly meet the need of a small but important subset of the community (see C. Anderson, The Long Tail: Why the Future of Business Is Selling Less of More, Hyperion Press (2006)). The invention is capable of identifying that long-tail interest along with the associated peer group and related content and can thus recommend those important long-tail products/content at the appropriate time (see FIG. 10). This is critical for product/content providers because it is often these long-tail products that are most useful to the community and often lead to the highest margins or benefits for the company itself.

Thus, the invention uses like-minded peers as an enabler to target small target segments along the long tail, instead of using individual problem personalization and historical interest as known in the prior art. The invention provides contextual targeting. People's needs within a given context are typically similar among like-minded people. An insight of the invention is that people have hundreds of profiles, if not thousands of profiles. These profiles have no cross connections to reality, so it is difficult to predict an individual's use level without context. Once the individual is in a particular context, i.e., among like-minded peers, the individual behaves similarly to everybody else within the group context. Thus, if a person is visiting a golf equipment site to buy a golf driver or clubs, the person behaves in a manner similar to other golfers. It does not matter what the person's political bias is, or their cultural background. These aspects of the individual have no relevancy because the person's present context, which is based upon group membership, is more relevant.

Wisdom of the Crowd

The invention represents a new approach to leveraging implicit community wisdom to create adaptive Web sites and other information portals. In his book, *The Wisdom of Crowds*, James Surowiecki explains how the collective intelligence of a large group of average individuals almost always outweighs the intelligence of experts. To illustrate the concept, he uses an example from a county fair, where a group of fair attendees attempted to guess the weight of a cow. A group of so-called experts, e.g. butchers, dairy farmers, etc., also made their guess. In the end, the experts were all off on their guesses by a large amount. The average weight guessed by the crowd of non-experts, however, came within one pound of the actual weight of the cow. Surowiecki goes on to show how a similar phenomenon can be seen in everything from stock market prediction to democratic governance. This notion that groups of individual actors can collectively exhibit a level of collective intelligence going beyond even the sum of the individual actors themselves has been known in the fields of biology and artificial intelligence as emergent behavior and collective intelligence. Numerous examples exist in nature where very simplistic individual animals, such as ants or bees, in collection exhibit extraordinary intelligence and resourcefulness in meeting the needs of group, such as finding food or building nests.

In the context of Web site design, Surowiecki's experts are the Web designers. These experts attempt to make correct decisions on which Web pages should be linked to what others, such that visitors are best able to find what they are looking for. Web designers may also spend a lot of time an effort tuning search results to match the expected needs of their visitors. The crowd in this context is the large group of Web site visitors who come to the site. Generally, the crowd has no direct impact on the organization of the Web site. They remain silent.

The invention gives this crowd a voice, enabling their collective actions, i.e. a form of expressed opinions, to be collected and automatically drive decisions on Web site organization through their impact on recommended content. The invention thus taps into the wisdom of the crowd for the purposes of creating useful Web sites. Although in the preferred embodiment, the impact of crowd wisdom is sectioned off into specific regions of recommendations and social search within the Web site, it is easy to imagine an extended implementation where the entire organization of the Web site, all of its links and menus, for example, are ultimately driven by and adapted to the behaviors of the Web site visitors. In this way, the entire Internet made up of multiple interconnected sites could begin to evolve and adapt into a form that best meets the needs of Internet users.

FIG. 11 provides a Wisdom of Crowds pseudo-equation showing how context/intent can be incorporated in a generalized way to extend the wisdom of crowds concept, as exemplified by an embodiment of the invention. In this pseudo-equation, each user's implicit vote is weighted according to the similarity between the current user's context and the context in which a user made that vote. This equation could be further extended to incorporate similarity between users. When all contexts are identical, this equation correctly reduces to a simple average.

Memory Prediction Machine

Figure 12:
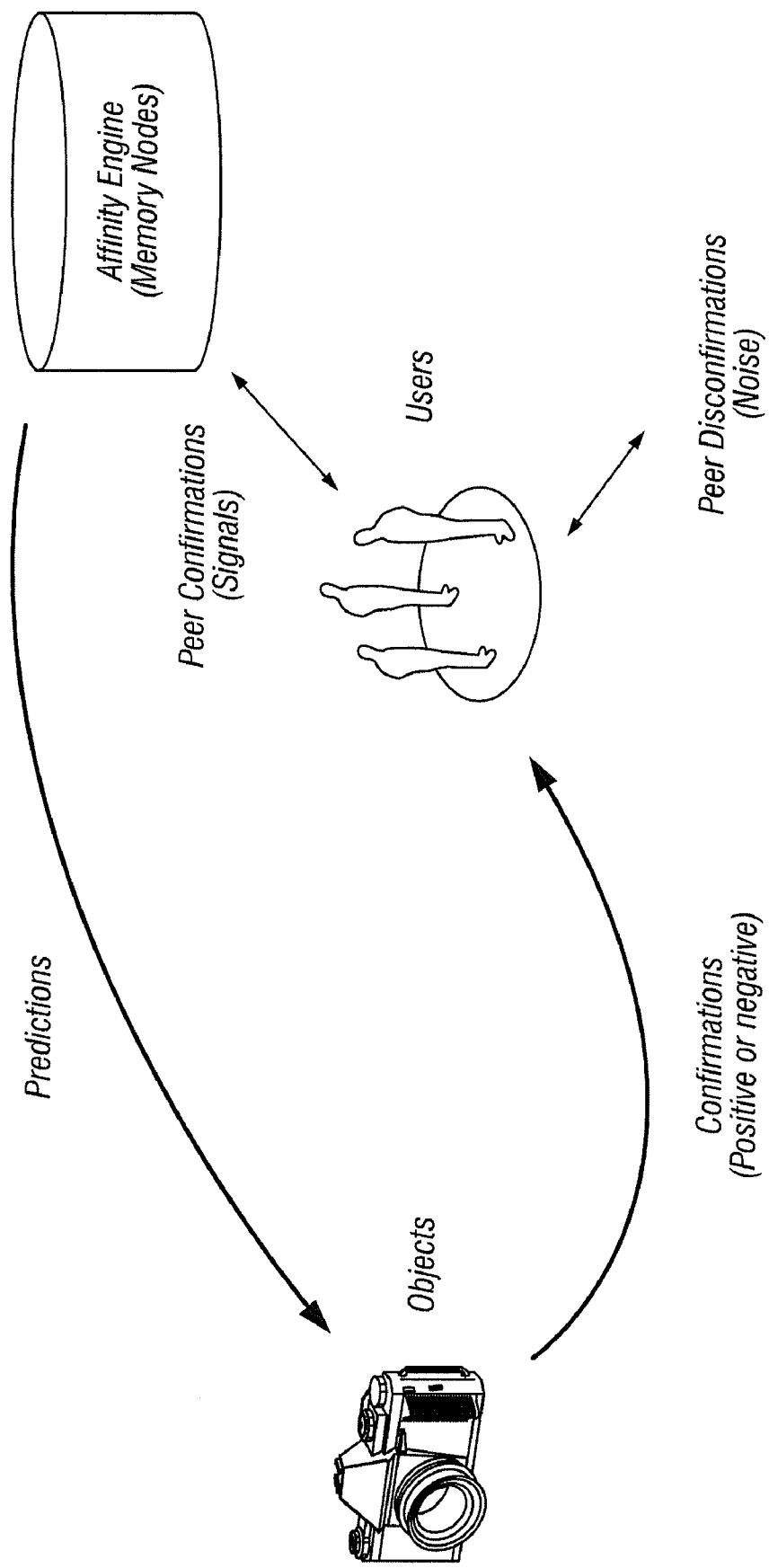
FIG. 12 is a schematic flow diagram showing an affinity engine memory prediction machine according to the invention.

The actions of the Affinity Engine can also be considered as a form of Memory Prediction Machine. Recent learnings from cognitive science teach that the brain is structured to capture and encode associations between and among objects and concepts in targeted regions of memory, and organize those associations in a hierarchy moving from abstract to detailed. New stimuli are responded to and their consequences predicted, based off of the memories created from previous stimuli and learned associations thus encoded. The Affinity Engine similarly learns associations between users, objects, and contexts by observing interactions between them in the environment of Web sites and remembers those patterns in its memory, stored hierarchically. When a user exhibits a context that has been previously learned by the Affinity Engine, it lights up the appropriate associations within memory which triggers the prediction of those objects that best meet the needs of the current user and context. FIG. 12 is an architectural schematic of the Affinity Engine in its function as a memory prediction machine.

Seamless Integration with External Systems

Figure 3:
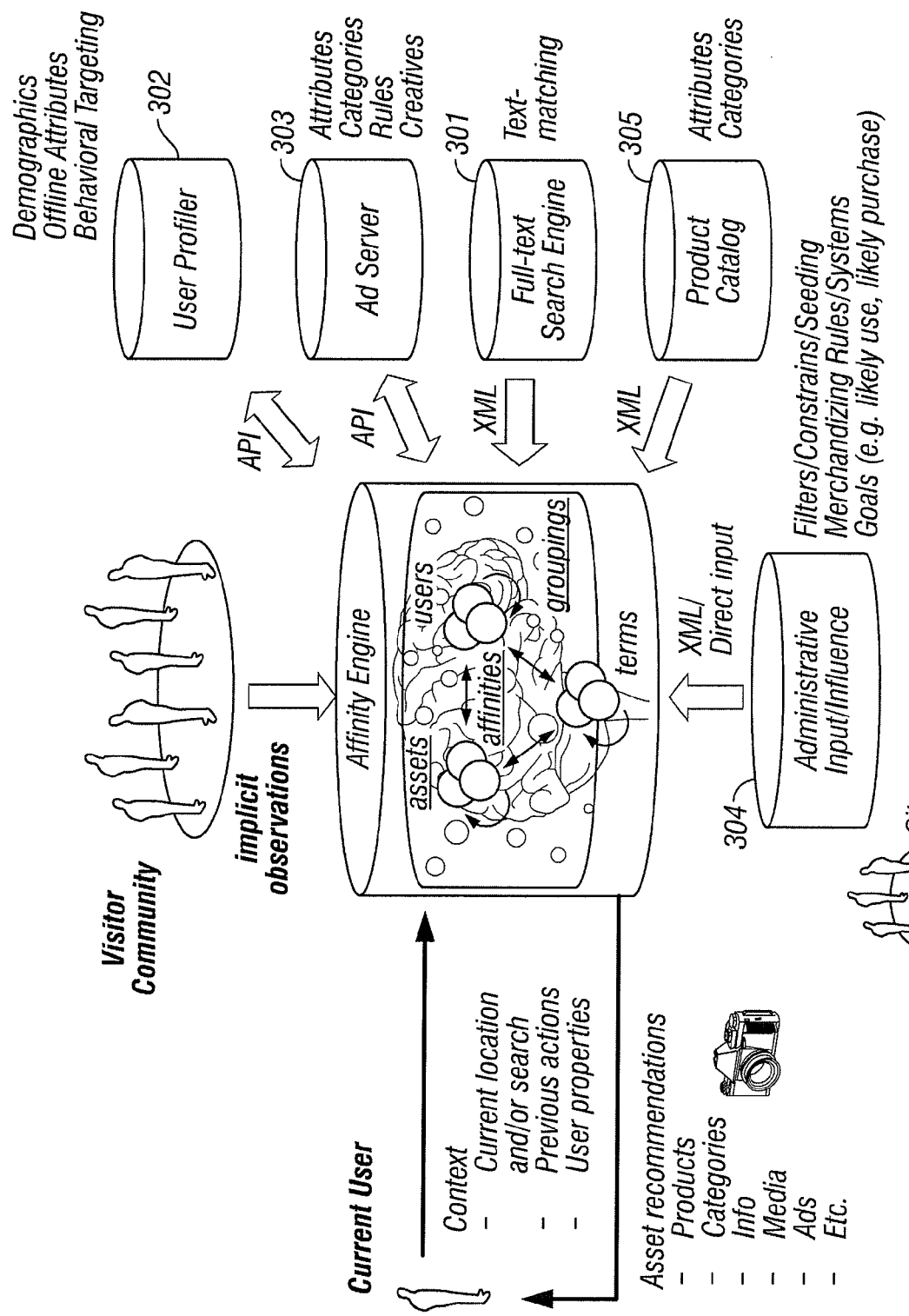
FIG. 3 is a schematic architectural diagram showing affinity engine integration according to the invention.

An important aspect of the invention is its ability to integrate seamlessly with other recommendation systems, policies, and information sources. Some examples are shown in FIG. 3.

Search Engine

When a user performs a search on a site implemented with the invention, the search terms are sent to the affinity engine for processing. The affinity engine determines the set of content that is most useful given the context of that search, based on learned affinities from past community behaviors. However, the affinity can also take into account opinions from external sources, such as a search engine. The search engine 301 has its own set of recommendations which the affinity engine can accept. The relevance ratings from the search engine can be combined with the information embodied in the affinity engine to produce a single unified set of recommendations (discussed more fully in U.S. patent application Ser. No. 11/319,928, filed Dec. 27, 2005). An XML feed is a typical way for the system to interface with a search engine.

Product Catalog

The invention also provides a mechanism for automatically importing product or media catalogs 305. The preferred means for doing so is using an XML feed that is accessible to the system. There are three ways in which the catalog can be used:

1) Information from the catalog may be displayed along with the recommendations, e.g. summary or price;

2) Attributes from the catalog may be used to filter the result set, e.g. the Web site designer may want to restrict recommendations to products only or PDFs only a particular section of the Web site;

3) Content categorizations can be used to group content for the purposes of normalization in the behavioral fingerprinting process described above.

Ad Servers

Another aspect of the invention is that it is content-agnostic. The system can observe behaviors on and recommend Web pages, pictures, videos, documents, blogs, downloads, and even ads. In the case of ad recommendations, it is often necessary to integrate with an ad server. Ad servers 303 can provide functionality similar to both search engines and catalog systems as described above. The invention interfaces with ad servers in the same way as it does to these, typically through XML.

Merchandizing Systems

Merchandizing systems 304 in the general case provide a mechanism for the Web site owners to influence what products/content are recommended to users. In the invention, it is preferred that the community be the primary driver of recommendations. However, there are times when the owners have specific needs that must be met independent from the community's expressed interest. For example, the owner may choose always to recommend a particular product or piece of content first in a particular context, for example, there may be a promotion going for a product. Owners may also wish to influence the community to purchase products with higher margins, or prevent a certain piece of content from being recommended. There are two ways in which the invention can honor such influence. The first is through a custom rule interface that is one component of the invention. Here, Web site owners can log in and choose from a variety of predefined rule types including pinning, i.e. forcing a particular recommendation to show up; blacklisting, i.e. preventing a given recommendation or class of recommendations from showing up; and boosting, i.e. increasing the chances that a recommendation or class of recommendations show up, but still honor the community wisdom. All of these rule types can be applied globally or only in a given context, e.g. on a particular page, for a given search term, for a given class of users, in a particular time range. Another type of rule allows owners to honor fully the community wisdom, but influence the goal of the recommendations. For example, rather than focusing on recommending useful products, the affinity engine can be told to recommend products that a user is most likely to purchase. As another example, the affinity engine can be asked to recommend content that most likely leads users to a particular set of target pages. In addition to the custom rule interface, the invention provides a mechanism for importing rules in XML form from an external merchandising application. When rule types exist in the external system that do not already exist within the invention, a custom rule plug-in can be designed for the invented system which matches the desired behavior of the external rule type.

User Profiling

A further type of system that the affinity engine can integrate with is user profiling systems 302. In its simplest form, a profiling system is a set of attributes, e.g. demographic attributes, associated with a user. These attributes can be passed along to the affinity engine on a recommendation request. As discussed earlier, the affinity engine can take these attributes into account when identifying a peer group, which then influences the recommendations that are returned. More sophisticated profiling systems require XML integration similar to other external components. Here, the affinity engine may have to dynamically contact the external profiling system during the peer identification process.

PREFERRED EMBODIMENT

Figure 14:
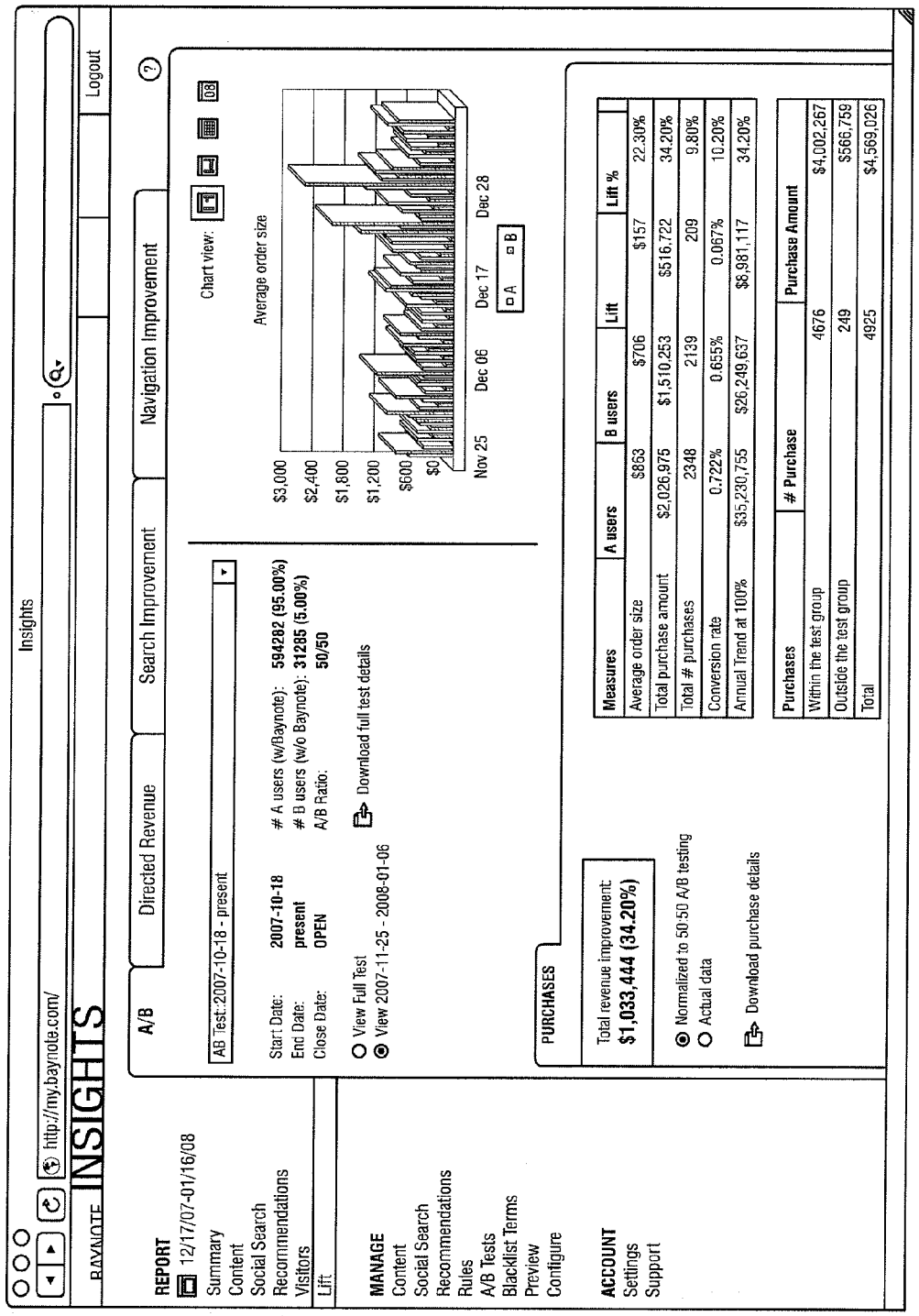
FIG. 14 is a screenshot of a lift report within the customer portal according to the invention.

In the preferred embodiment of the invention, a Recommendation System is implemented in a Software as a Service (SaaS) Model to provide automatic suggestions that help Web site visitors find products or content they like or need. FIG. 2 is an architectural schematic diagram of a method and apparatus for context-based content recommendation. In FIG. 2, interaction of users with a Web site produces implicit emergent behaviors. Such user interaction includes page referrals, links, entry trails, queries, page sizes, mouse movements, peers, negative experiences, virtual bookmarks, time spent, virtual printing, exit trails, and the like. Such behaviors are processed in a recommendation/affinity engine according to the invention, resulting in automatic content and product recommendations in the form of social search and navigation guides, as well as providing real-time feedback to a merchant such as regarding visitor clubs, and identifying content gaps (each of which is discussed in greater detail below). The following key processes comprise the recommendation system:

- Capturing Implicit Behavior—The implicit Web site behaviors 201 that serve as input to the recommendation system are captured client-side by small snippets of JavaScript code embedded within Web site pages, e.g. through a Web site template. The behaviors are then sent to the remote recommendation engine where they are processed using the full-spectrum behavior fingerprinting technology described herein.
- Distilling Collective Wisdom—The recommendation/affinity engine 202 processes all incoming information to identify emerging intent among Web site visitors and captures the collective wisdom of the crowd. The recommendation engine identifies and learns affinities between and among users, content, and terms, identifying consistent patterns of behavior and removing noise. The affinity engine also recognizes and adjusts in real time to changing fads and trends, as well as cyclical patterns of behavior, such as seasonal patterns, and other shifts in user interest.
- Delivering Recommendations and Search Results—When a visitor arrives at a page, the recommendation engine is passed information about the users current context, either by snippets of JavaScript on the client, called Recommendation Tags, or by the Web site server, and a request is made for appropriate recommendations. The recommendation engine translates the user's context into intent using the technology described in this application, identifies the appropriate group of peers, and ultimate returns with a set of content recommendations 203 ordered based on the their computed UseRank™. These recommendations are then displayed within the Webpage on the user's browser. These recommendations may take the form of navigation links or enhanced search results. When delivering recommendation results, the recommendation system may additionally contact other external services, such as the Web site's full-text search engine, product catalog, or an ad server (see FIG. 3).
- Customer Portal—In the preferred embodiment, owners of the Web site also have access to information and patterns learned by the recommendation engine through a customer portal called Insights 204. The customer portal provides the ability to configure the recommendation system and add merchandising rules, as well as view a set of reports providing information on the usage of the Web site by the community and the patterns of behavior and affinities learned by the system. FIG. 13 shows a screenshot of the Customer Portal homepage in the preferred embodiment. Many different reports and configurations are accessible using links within this portal. For example, the invention allows for product/content gap detection, where gaps are detected based on usage patterns on the site and site owners are helped to introduce new products or content in those areas where the gaps are detected. As another example, the Customer Portal also provides the Web site owner with a set of reports to track the ongoing value that the Recommendation Engine is brining to the Web site. FIG. 14 shows a screenshot of an A/B report that tracks the revenue lift due to the presence of recommendations on the Web site. The inventors have consistently seen revenue improvements of 20-30% or more. Other lift reports available within the portal include improvements in page views, engagement time, site stickiness, average order value, and user conversion to specified "business targets" within the Web site.

Applications

Figure 15:
FIG. 15 is a screenshot showing community-guided e-commerce according to the invention, including recommendations for competing and complementary products according to the invention.

The following discussion involves different applications of the foregoing technology:

FIG. 15 is a screenshot showing community-guided e-commerce. In FIG. 15, five different capabilities of product recommendations are presented:

1) Comparative Products, also known as Similar or Competitive Products, are shown for purpose of comparison shopping and up-selling based on affinity of like-minded peers on their product considerations, i.e. observed full-spectrum behavioral finger prints discussed earlier. Consideration-based peer recommendations promote higher end/niche products, and yield more revenues and profits for a site.

2) Affiliated Products are also shown for cross-selling related/non-competitive products such as accessories to increase overall order size.

3) The invention also provides a showing of most popular products, such as products with greatest appeal across the whole site or within a category.

4) The invention also generates intent-driven landing pages, also known as AdGuide and Site Concierge, with recommendations based on what a visitor searched on standard Web search engines such as Google, Yahoo or MSN. If a visitor search "Viking Cooktop" on Google and landed on a customer site, AdGuide serves the best Viking cooktop recommendations to the visitor on the landing page dynamically instead showing him something irrelevant.

5) The invention also provides a community filtered search on products based on the foregoing.

For peer-driven recommendations, the invention automatically identifies small and large population segments having a unique interest and guides individuals to popular, competing, and accessory products. The invention provides a user intent and product mapping that translates shoppers' intent into peer-validated products and brands. The inventors have found a 700 percent conversion power based on independent studies. The invention provides fad and trend detection and recognizes and adapts to seasonal, promotional, and other shifts in shopper interest in real-time. The invention also allows for product gap detection, where product gaps are detected and site owners are helped to introduce new products or content in those areas where the gaps are detected. The invention assists in merchandising with real-time customer feedback. It works with existing merchandising, promotions, segmentation and search, and magnifies products or product families. The invention provides built-in concurrent A/B measurement and reports in real-time the net revenue generated by the invisible crowds.

Figure 16:
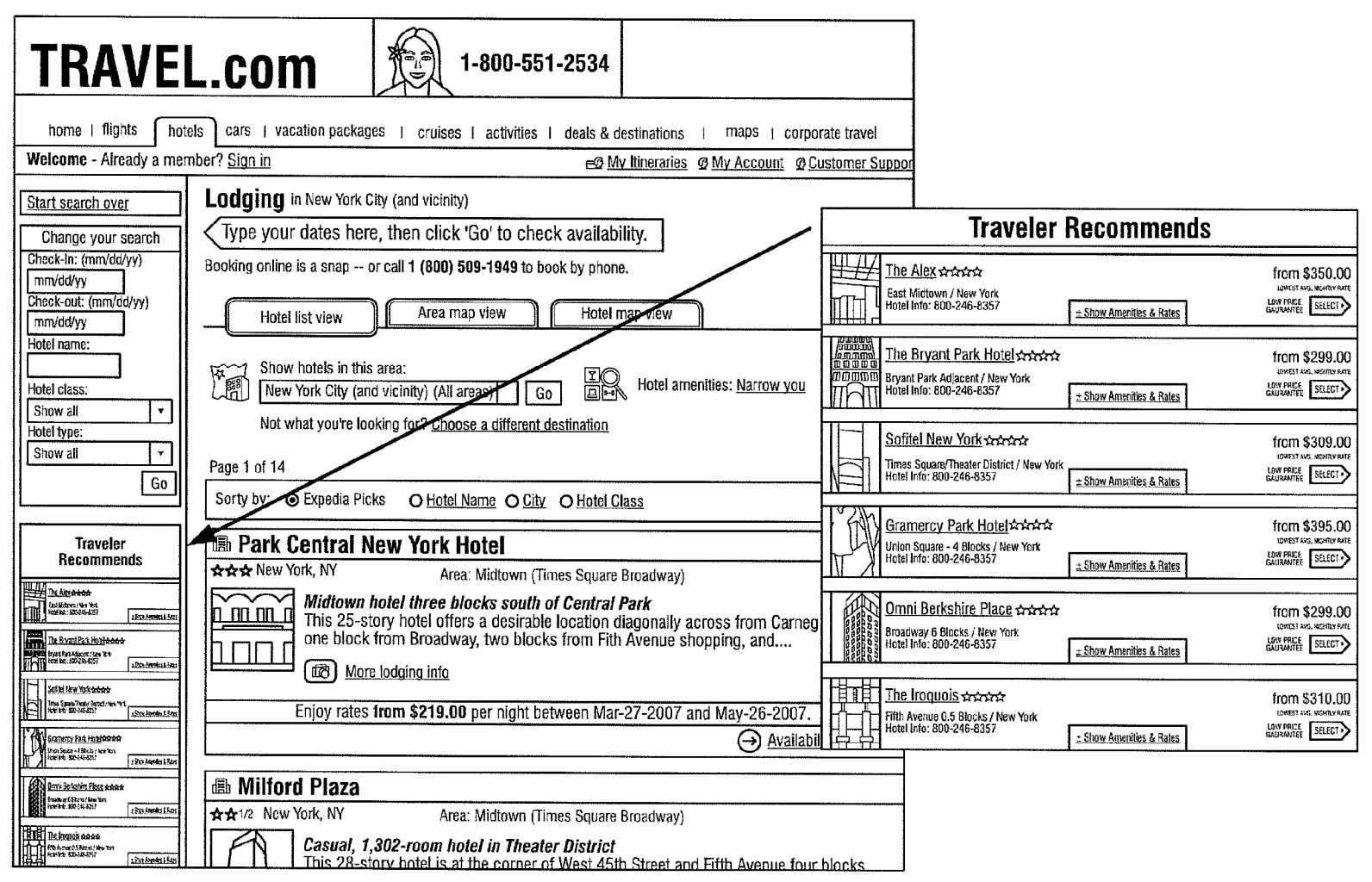

FIG. 16 is a screenshot showing community-guided product search with a travel example. In FIG. 16, the user has queried for hotels in New York City. As a result of similar users of this Web site for similar purposes, and by observing how the users have made use of the information returned, recommendations are made to the person with regard to hotels to select within New York City. The search results are far more effective and relevant based on like-minded peer interests and intent instead of showing many irrelevant results by simply matching keywords or metadata, in this case "New York Hotels".

FIG. 17 is a screenshot showing community-guided marketing and online lead generation. As with the e-commerce application, Five different capabilities are provided to a marketing Web site.

1) Aspects of this feature of the invention include a social search which involves UseRank™ and implicit learning. This approach is intent-driven, adaptive, and makes use of an implicit folksonomy, community terms such as link-text they use and search queries they enter, as discussed above. The invention supports audio, video, binary code, and all other content types because it does not have to parse the content itself, whereas a typical search engine has to, therefore is limited to text content and metadata only.

2) The invention also provides Related or Similar Content based on the implicit behavioral feedback of like-minded users. The invention ranks the recommendations by usefulness and on-target-ness, based on the context and intent.

3) The invention also provides a most popular category, which provides content with the greatest value across the whole site or sub portion of the site. This promotion of information leads to business target conversion increases such as trial/download/registration conversions and may be provided at a site or topic level.

4) A Next Step feature is provided that concerns common next steps that lead to customer conversions. The next step may be any next step in a business process or a natural next set of content to read in connection with the process.

5) A similar Intent-Driven Landing Page, as with the e-commerce application discussed above, is available for a marketing Web site.

Figure 18:
FIG. 18 is a screenshot showing social search and community information popup/overlay according to the invention.

FIG. 18 is a screenshot showing social search according to the invention. In the example, the search is made for storage devices. Users are provided information with regard to whether the information is on target and for how many visitors, and popularity rating and a community rank, i.e. UseRank™. An on-target value is also provided along with the results. Further, the results are sorted by usefulness, based on information within the affinity engine. The original keyword rank from IR or full-text search engine is also provided as a before-and-after comparison. In this example, if the UseRank™ is not used, this good piece of primary storage product information would have been buried as rank 87, i.e. the seventh result on the ninth search result page, and no one would be able to find and use it. The UseRank™ has moved it to the third position on the first page in the search results. At the interface level, a Raw Results link is provided to give the users the original results if this invention were not used there. This is another way to see before-and-after impact of the UseRank™.

Figure 19:
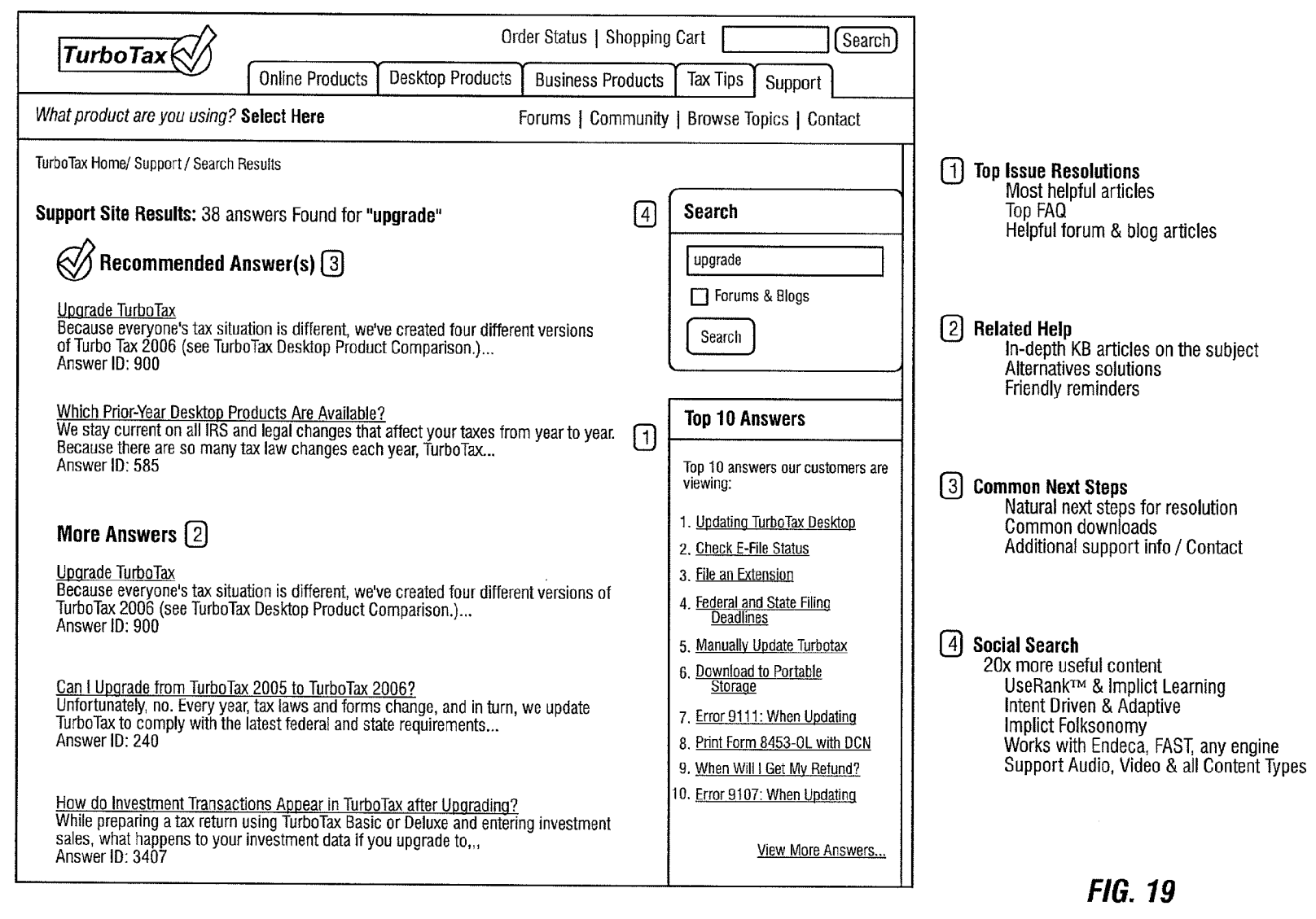

FIG. 19 is a screenshot showing community-guided online support to promote self-service and satisfaction among the customer base. The page shows top issue resolutions, including most helpful articles, a top FAQ, and help forum, and blog articles. The page also shows related help, including in-depth articles on the subject, alternative solutions and, finally, reminders. Further, common next steps are provided, including natural next steps for resolution, common downloads, and additional support information and contact information. Finally, the invention shows social search, which is a key aspect of this embodiment of the invention, based on UseRank™ and implicit learning. Thus, social search is intent-driven and adaptive, makes use of the implicit folksonomy, and supports all content types. Other good support applications for this use include knowledge management (KM) portals, community forums and discussion threads, chats, wikis and developer's networks, etc.

FIG. 20 shows a community-guided intranet and knowledge portal. In this example, social search is used within an intranet. The search returns related pages, which include similar pages on the topic, the pages are proven by the past experience of peers, and serendipitous discovery is enabled. Further, the search filters out low value content. The invention also provides most popular search results, which includes content with the greatest value, top applications within the company, and information specific to a department or cross-company information. Finally, the invention provides next steps, including where people go from this page to meet their goals, a next step in the business process, and the next set of content to read on the topic. Extranets, such as physician-patient portals, dealer net, customer portals, are other applications examples.

Figure 23:
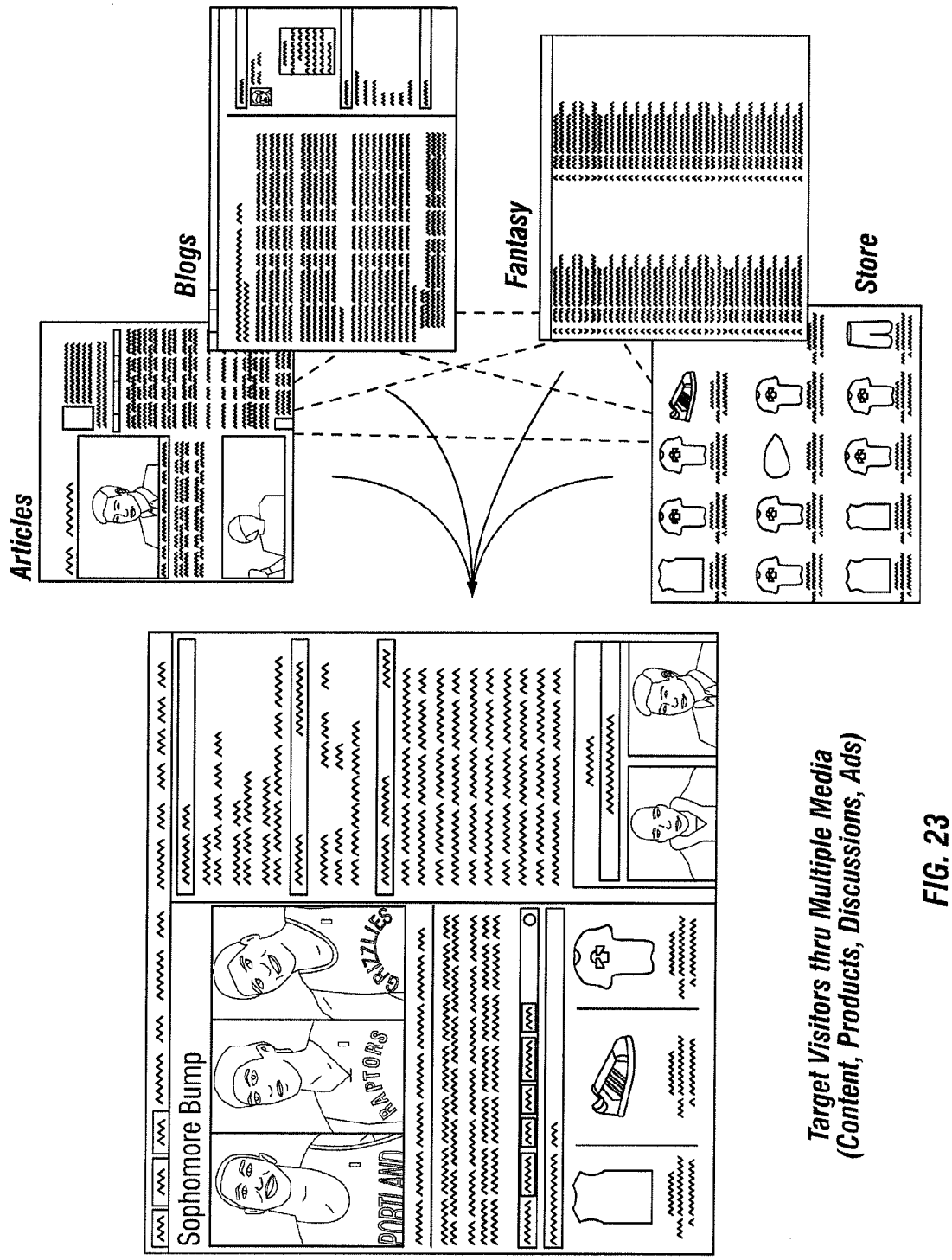
FIG. 23 is a screenshot and schematic diagram showing community-guided cross-site recommendations for media according to the invention.

FIG. 21 shows recommendations implemented on a media site, and FIG. 22 shows social search implemented on a media site. FIG. 23 is a screenshot showing community-guided media and cross-site contextual recommendations. Similar Articles and Blogs are recommended based on similar contexts. If you are reading a Tiger Woods golf story, three other related Tiger news, based on other similar peer interests are promoted to the same visitors. The visitor gets more content and satisfied. The site get higher CPM and CPA, both of which are current industry measures of visitor conversion rates and site value from advertising perspective. UseRank™, also known by Baynote as BrandRank™, can also be used to re-rank the ads and product on the media, instead of placing ads or products randomly or based on keyword match. Ads validated by peers have significant higher CPM and CPA values, and therefore increase revenue for the media sites. In addition, the information contained in these various sources is applied to the affinity engine, which discovers cross-site affinities among the various sites. The result is to provide targeted content and products.

Figure 24:
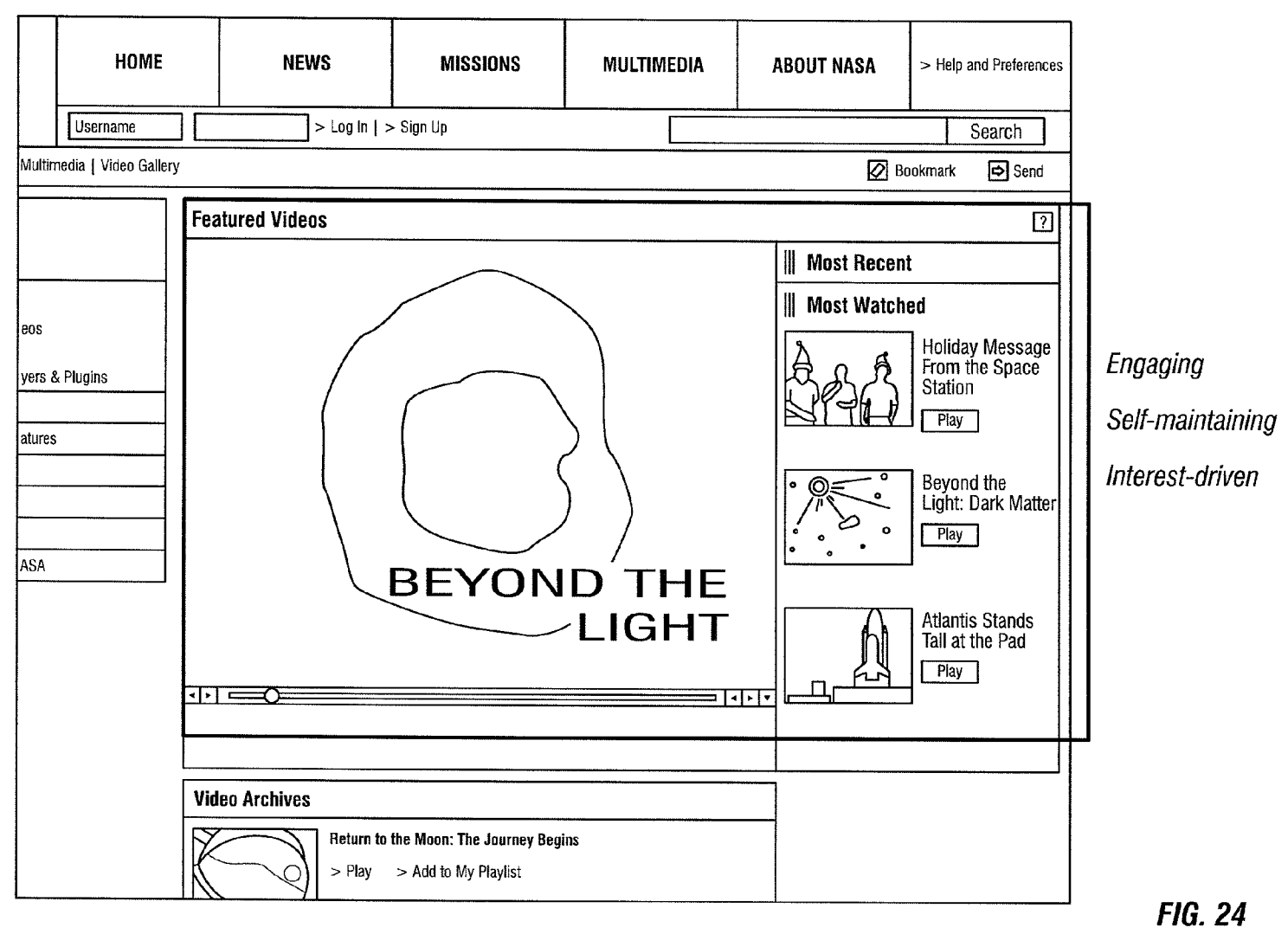

FIG. 24 is an example of the invention being used to recommend video content. As discussed in this application, the invention is content agnostic and is able to learn affinities between term, users, and content based entirely on implicit user actions.

FIG. 25 shows a screenshot of an Implicit Topic Cloud. Another application of the invention is to collect and display the community vocabulary or terms. On the surface, the Topic Cloud may appear to be similar to explicit tagged cloud such as Deli-cio-us, social bookmarking, etc. But the key difference is the implicit-ness. Implicit Topic Cloud is built based on the actual user's activities on the site, i.e. the queries they entered and link-text they used. Actions speak louder than words. The implicit Topic Cloud reflects in the interests of 100% of the site visitors, not the few loud visitors who are willing to tag things. The silent majority is the key to collect true wisdom of the community.

Figure 26:
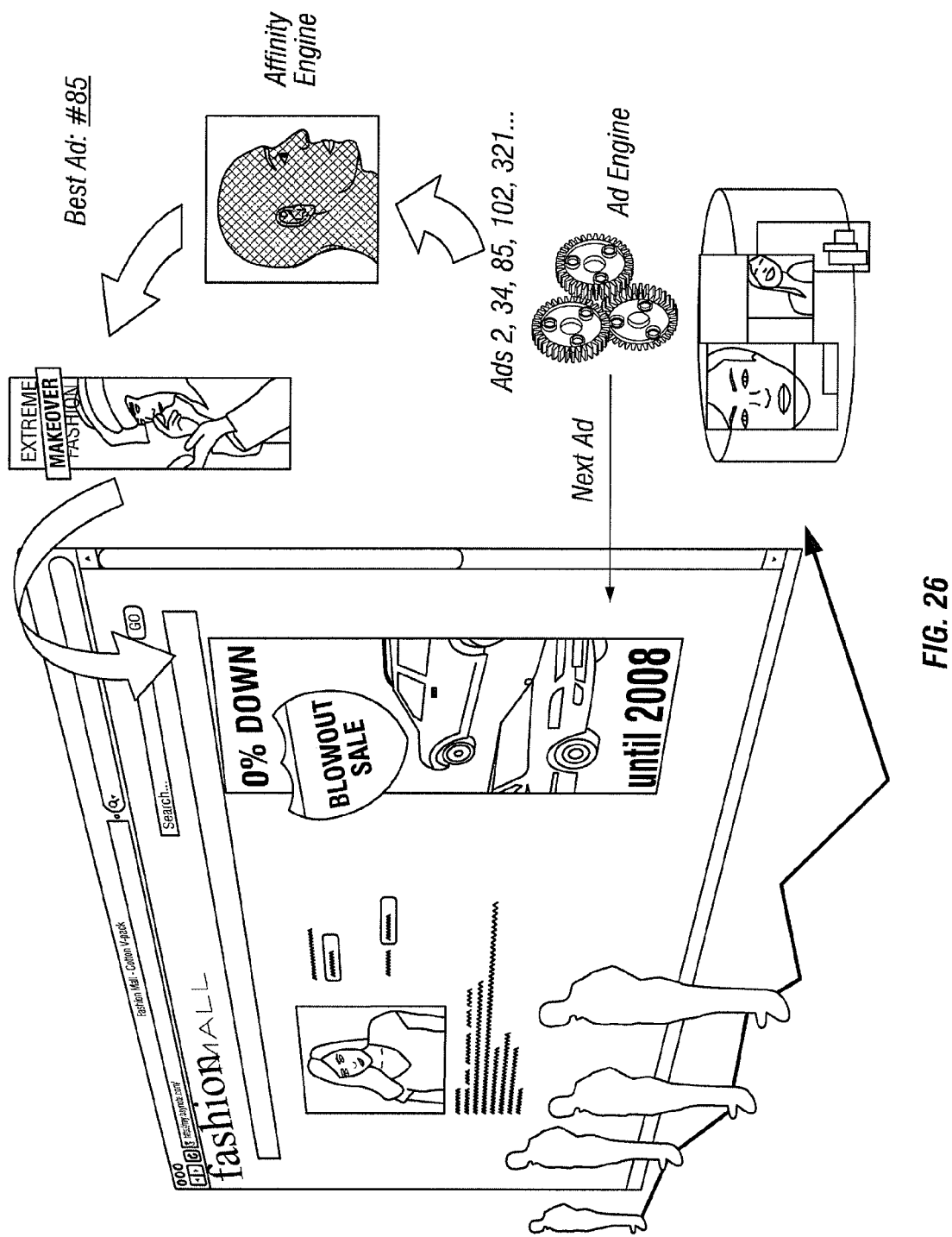
FIG. 26 is a schematic flow diagram showing the community-guided context-relevant Ad recommendations according to the invention.

FIG. 26 shows an architectural view of an integration between the invention and an AdServer. To serve the best ad to a user, the integrated system first contacts the existing Ad Server to get a list of acceptable ads to display to the user given demographic or other information. This list is then sent to the Affinity Engine which, based on learned affinities between the Ads, users, and context, chooses the best ad to display to the current user. This allows the ads served to be appropriate both to the user, as well as the user's current context and intent.

Figure 4:
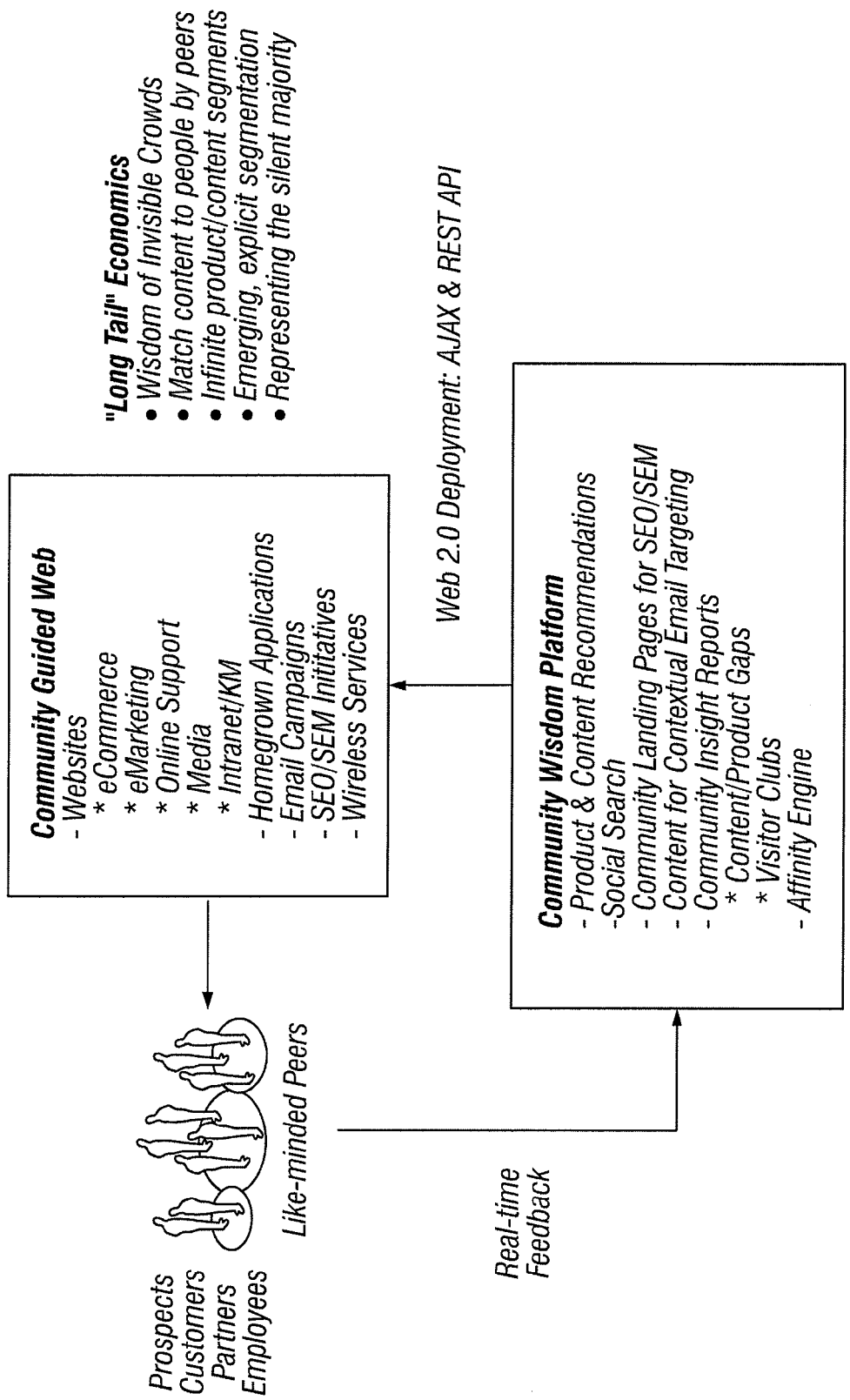
FIG. 4 is a schematic architectural diagram showing a dynamic, adaptive, real-time platform of community wisdom and community guided Web according to the invention.

There are many ways to leverage the community wisdom distilled by the Recommendation Engine, in addition to social search and onsite content/product recommendations. Many applications can be built or modified to directly tap into this wisdom through APIs to the Recommendation Engine. FIG. 4 is an architectural diagram showing the invention's role as a community wisdom platform. The community-wisdom platform can also include such items as contextual email marketing, mobile applications, IPTV systems, SEO/SEM applications, and mashups in custom applications. Within these systems, input from the Recommendation Engine can be used to dynamically determine the most appropriate information and/or organization of information to present to users. Such a platform is built upon Web services that include such features as AJAX and REST (discussed below). Thus, the invention is built upon new Web 2.0 fundamentals, which include a true understanding of invisible crowds, gathering information from like-minded peers, making content or product recommendations, providing onsite social search, implicit community-based reports, and the like. The following descriptions give details on how they are deployed:

Email Recommendations: Marketing uses massive emails to communicate with customers and prospects. But the content of the email campaign is typically determined by the marketing staff. The invention enhances the quality of email campaigns by crowd-sourcing the like-minded peers. The content of the emails are determined by what's popular or similar to what the like-minded readers of the emails are interested in. Marketers simply facilitate the process of letting one customer promoting content to another customer implicitly.

Mobile Recommendations: The quality demand of mobile recommendations is even higher than the Web due to the small footprint of mobile devices, such as cell phones and personal devices. The invention's like-minded peer and intent driven approach is better than traditional approaches based on collaborative filtering, page views, and demographic or purchase data. Intent/context driven peers predict people's need far better than the competing approaches.

IPTV Recommendations: Similar recommendations are effective for using Digital TV/HDTV to watch internet delivered movies and video programs. With thousands of movies and TV program selections, features like "You may also like these movies" are extremely important for up-sell and cross-sell movies and TV programs. Context-driven peer recommendations are the most effective way for the viewers to like the recommendations.

Figure 27:
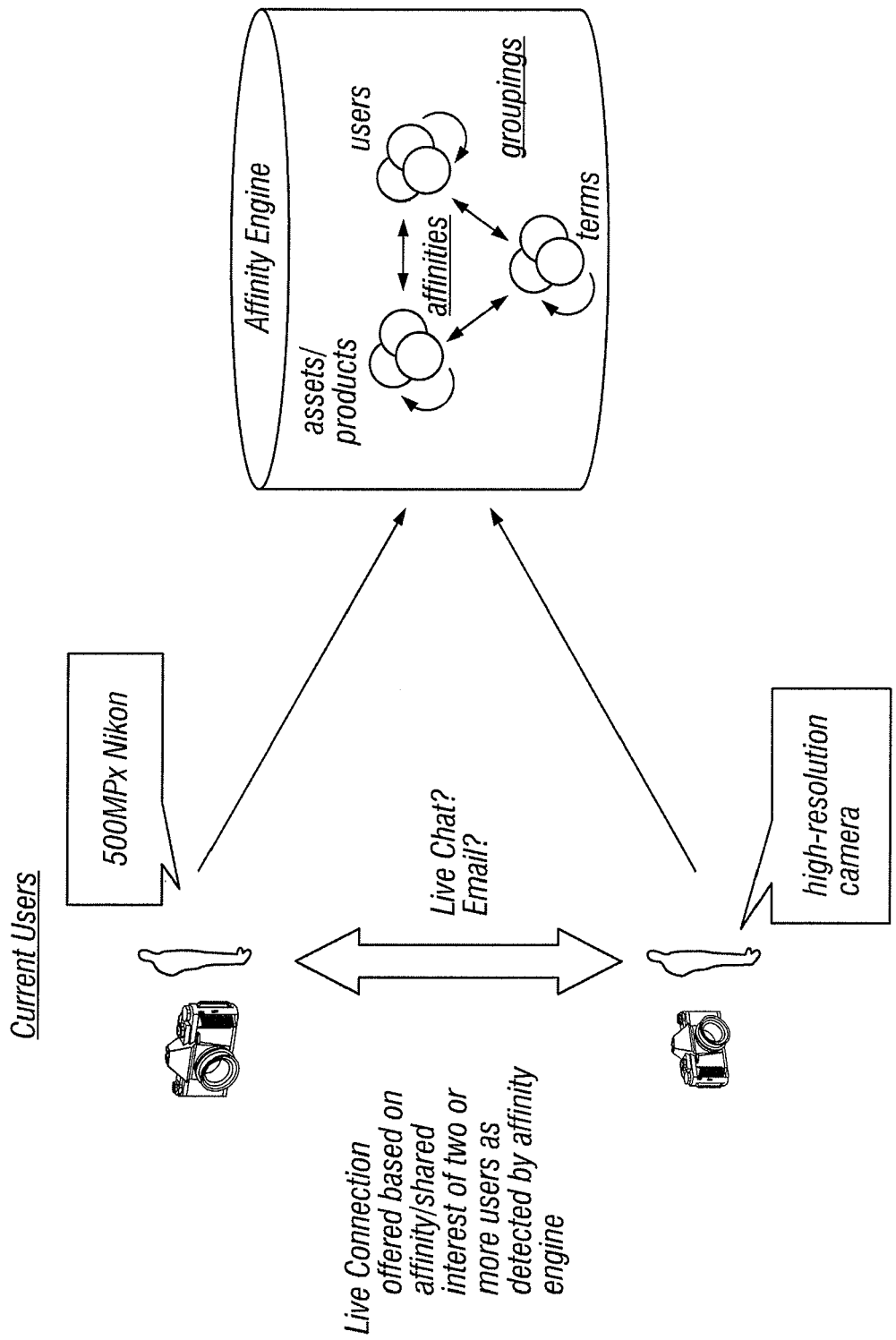
FIG. 27 is a schematic flow diagram showing a live connection according to the invention.

Live Connect: FIG. 27 shows an architectural view of the Live Connect system. Because the invention can identity like-minded peers, in addition to harvest their collective wisdom implicitly and to make peer recommendations to individuals, the invention can connect the individuals with the like-minded peer group and have them exchange information, knowledge, and experience. This is similar to the real world experience of like-minded peers who may not know each other. Imagine you are in Best Buy shopping for a TV, you see other like-minded peers also shopping for TVs, you can ask them questions for their experience of certain products.

SEO/SEM Recommendations: The invention is also used for guiding Web site visitors at the moment of landing on the site. The features are called "AdGuide," "Site Concierge", and "Site Maitre'd." This application examines the queries that people have searched on Google, Yahoo, MSN, ASK, and other major Web search engines, then uses them as the proxy of user intent to display the right product or content for visitors when they land on the site, either on the pre-designed landing pages (SEM), or natural search result pages (SEO). For example, if a visitor search "Viking Cooktop" on Google and landed on a Baynote customer site, AdGuide serves the best Viking cooktop recommendations based on collective interests of like-minded peers to the visitor on the landing page dynamically instead showing him something irrelevant or less important by simply matching keywords.

Based on the affinities learned by the affinity engine, the invention is also able to provide a Keyword Recommendation system that provides suggestions to marketers on which keywords should be purchased on external search engines as part of their SEO/SEM efforts. For example, the invention can suggest those terms that the community uses most often to describe content on a Web site, as well as those terms which are most likely to lead to useful content within the site. Also, given a particular collection of keyword already purchased, the invention can suggest other words used by the community that have high affinity to the existing set. These recommendations can be provided to SEO/SEM merchandisers either through reports within the Customer Portal or can be directly integrated with external SEO/SEM systems to bid on the recommend keywords dynamically and automatically.

Blogs, Forums, and Discussion Threads Recommendations: The invention is used by community generated content such as blogs, forums, discussions, pod casts, video content, etc. Because of the volume of content involved, surfacing the right content in the right order is even more important than expert-generated Web sites. Using like-minded peers for recommendations and social search is extremely important and effective. These Web sites can be public facing blog sites, or login-required sites such as partner portals or patient-physician portals, or developer's networks, or intranets. Features such as "Similar content," "Accessory products," "Next steps," "Most popular" and social search are very useful and effective.

Insights (Visitor Clubs, Content Gaps, etc.): Insights, the Customer Portal, has already been discussed in part earlier in this application. Although a primary use of the invention is as an automatic recommendation system, there are times when site administrators may want to modify the behavior of the recommendation system or see reports based on the knowledge learned by the affinity engine. Insights currently offers three main categories of functionality though its UI: configuration, management, and reports. Configuration enables site administrators to configure fully all aspects of the recommendation engine required for full functionality and deployment, including integration with external sources of information such as full-text search engines and ad servers. Management enables site administrators to modify the behaviors of recommendations and social search in a holistic manner or specific to defined contexts e.g. a particular search term or page location or user. For example, administrators can create product/content promotions to override community wisdom for set periods of time, blacklist particular products/content from being recommended, artificially magnify or boost defined classes of products/content, or set up business rules such as limiting the classes of products/recommendations acceptable for recommendation in particular contexts. Reports offer various views on the community wisdom distilled by the affinity engine. Although the reports include a subset of the click-based and purchase-based information found in traditional analytics, they go beyond these in providing many details on the community wisdom distilled through full-spectrum behavioral fingerprinting and the connections learned by the affinity engine. Example reports are discussed below.

The Content Gap report uses the affinity engine to analyze those user interests that are not being met by the existing content on the site. Using the full-spectrum behavioral fingerprinting technology, and by analyzing community behaviors as discussed earlier in this application, the affinity engine can identify community interests. The affinity engine can then analyze all cases in which a particular interest was expressed by a user and the subsequent behaviors of that user, including use of content and level of value extracted, as well as subsequent searches or exits. If a large portion of the user population with a particular interest is unable to find useful content, then that interest is designated a content gap. The degree to which the gap is suspected by the affinity engine can also be reported. The administrator can then take necessary actions to remedy the gap by adding new content and then continue to use the Content Gap report to see the effect on the presence of the gap.

The Visitor Clubs report provides the most comprehensive view on the affinities learned by the affinity engine. Visitors to the site are implicitly grouped based on shared interest. Each interest group, or visitor club is displayed in the interface along with the number of visitors in the club, their overall activity level, the virtually folksonomy of terms that describe the club, and the content/products which are most useful to that club in the context of the club's interest. In addition, all club characteristics can be charted over time to gain an understanding of how the interest is trending over time. Clubs can also be compared to one another for overlap in membership. This report provides administrator with the ability to explore the learned associations between users, content/products, and terms/contexts. Such associations can then drive promotions or other merchandizing activities within the Management section of Insights. The visitor club information can also be used to drive various business decisions outside of the context of the invented system.

Architecture

Recommendation Server

FIG. 3 is an architectural schematic diagram showing affinity engine integration according to the invention. In FIG. 3, a current user exhibiting an observable behavior within a particular content site, such as current location and/or search, based on previous action, or user properties, accesses the affinity engine, which includes assets/products, users, and terms, all arranged in groupings based on affinities. The user is provided with asset recommendations in connection with products, categories, information, media, and the like. The affinity engine is populated by site owners who provide administrative input and exert administrative influence. The information provided by XML/direct input. The administrative input and influence filters, constrains and seeds the affinity engine, applies merchandising rules, and expresses goals, for example, likely use or likely purchase of a particular product. Asset information is also provided in the form of XML information, for example, a product catalogue or a full-text search facility. The affinity engine collects implicit observations from the visitor community to make such asset recommendations to a current user. These implicit observations include asset actions, such as time spent on a page, scrolling, mouse movements or clicks, page interaction, and virtual printing or bookmaking; asset navigation and asset navigation patterns, including, for example, entrance path, exit path, links used, repeated visits, and frequency visits, use of a back button, and recommendation use; and visitor-community searching, including terms entered and/or reentered, results clicked, results used, and subsequent navigation.

Figure 28:
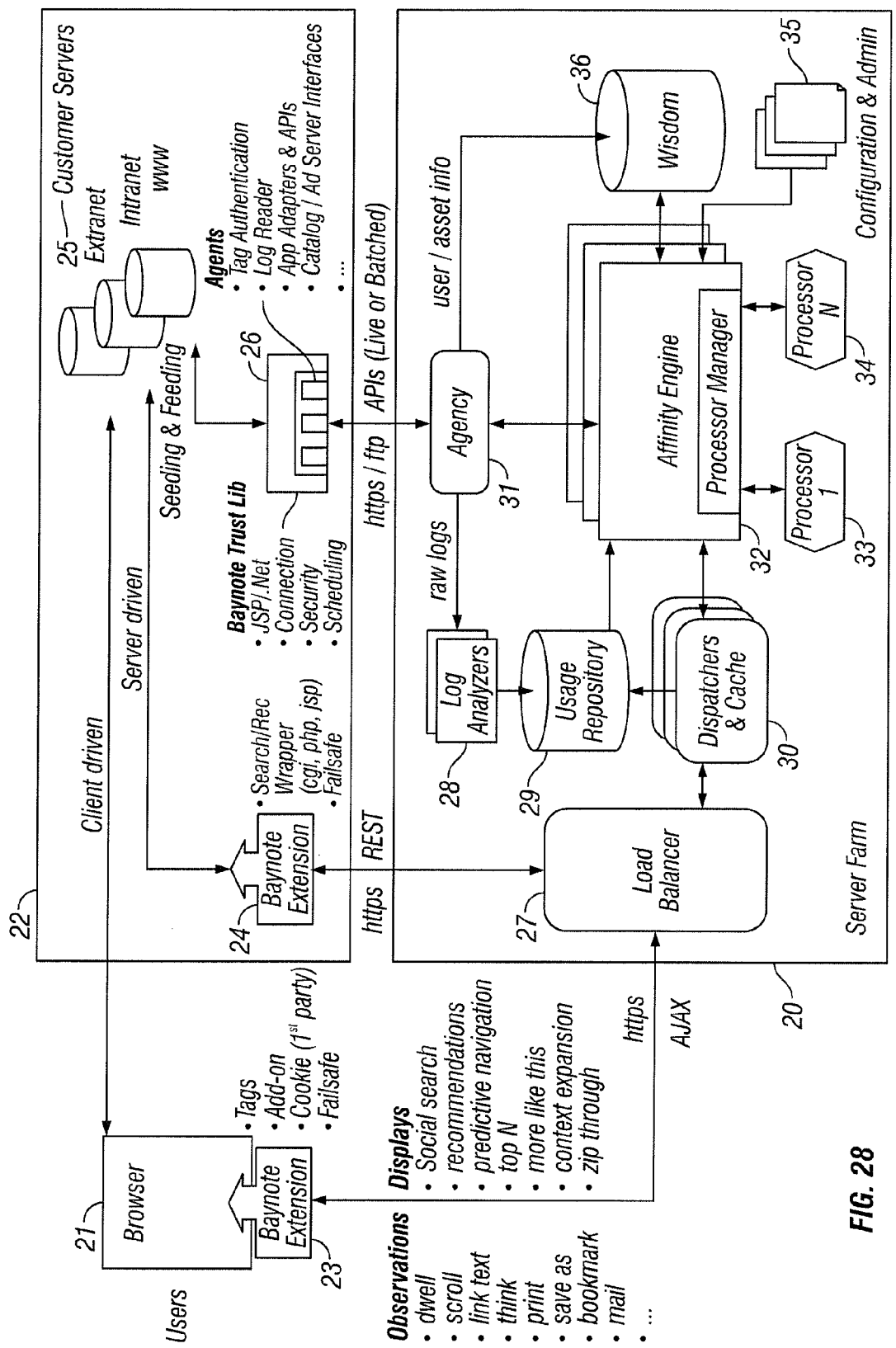
FIG. 28 is a block schematic diagram showing the system architecture of a preferred embodiment of the invention.

FIG. 28 is a block schematic diagram showing the system architecture of a preferred embodiment of the invention. A more detailed discussion of various aspects of this architecture is provided below. To understand FIG. 28 in greater detail, reference may be had to Applicant's copending U.S. patent application Ser. No. 11/319,928, filed Dec. 27, 2005, which is incorporated herein in its entirety by this reference thereto, and which describes, in greater detail, a preferred system for use in connection with the invention herein.

The architecture consists of a server farm 20, a customer enterprise 22, and a user browser 21. The user browser is instrumented with an extension 23 and accesses both customer servers 25 at the customer enterprise 22 and the server farm 20 via a load balancer 27. Communication with the server farm is currently effected using the HTTPS protocol. User access to the customer server is in accordance with the enterprise protocols. The browser extension 23 is discussed in greater detail below.

Of note in connection with the invention is the provision of a failsafe. The extension 23, as well as the enterprise extension 24, are constructed such that, if the server farm 20 does not respond in a successful fashion, the extension is shut down and the enterprise and browser interact in a normal manner. The features of the invention are only provided in the event that the server is active and performing its operations correctly. Therefore, failure of the server does not in any way impair operation of the enterprise for users of the enterprise.

As discussed above, an extension 24 is also provided for the enterprise which communicates with the load balancer 27 at the server farm 20 via the HTTPS protocol.

The enterprise also includes a helper 26 which communicates with the server farm via an agency 31 using the HTTPS protocol. The agency retrieves log information from the enterprise and provides it to log analyzers 28, which produce a result that is presented to the usage repository 29. The agency also communicates with any data sources accessible to the enterprise for the purposes of loading information into the affinity engine 32. Such information includes catalog database information, use profile data, authentication data, as well as any other form of data that may be useful for the purposes of determining or filtering recommendation and search results.

Information is exchanged between the affinity engine 32 and the browser and enterprise via various dispatchers 30. The browser itself provides observations to the server and receives displays in response to search or recommendation requests therefrom. Alternatively, the customer server 25 can directly request search or recommendation results directly from the affinity engine 32 through the Baynote extension 24 using REST.

A key feature of the invention is the affinity engine 32 which comprises a plurality of processors 33/34 and a configuration administration facility 35. During operation of the invention, a form of information, also referred to as wisdom, is collected in a wisdom database 36.

Client-Side Integration

Figure 29:
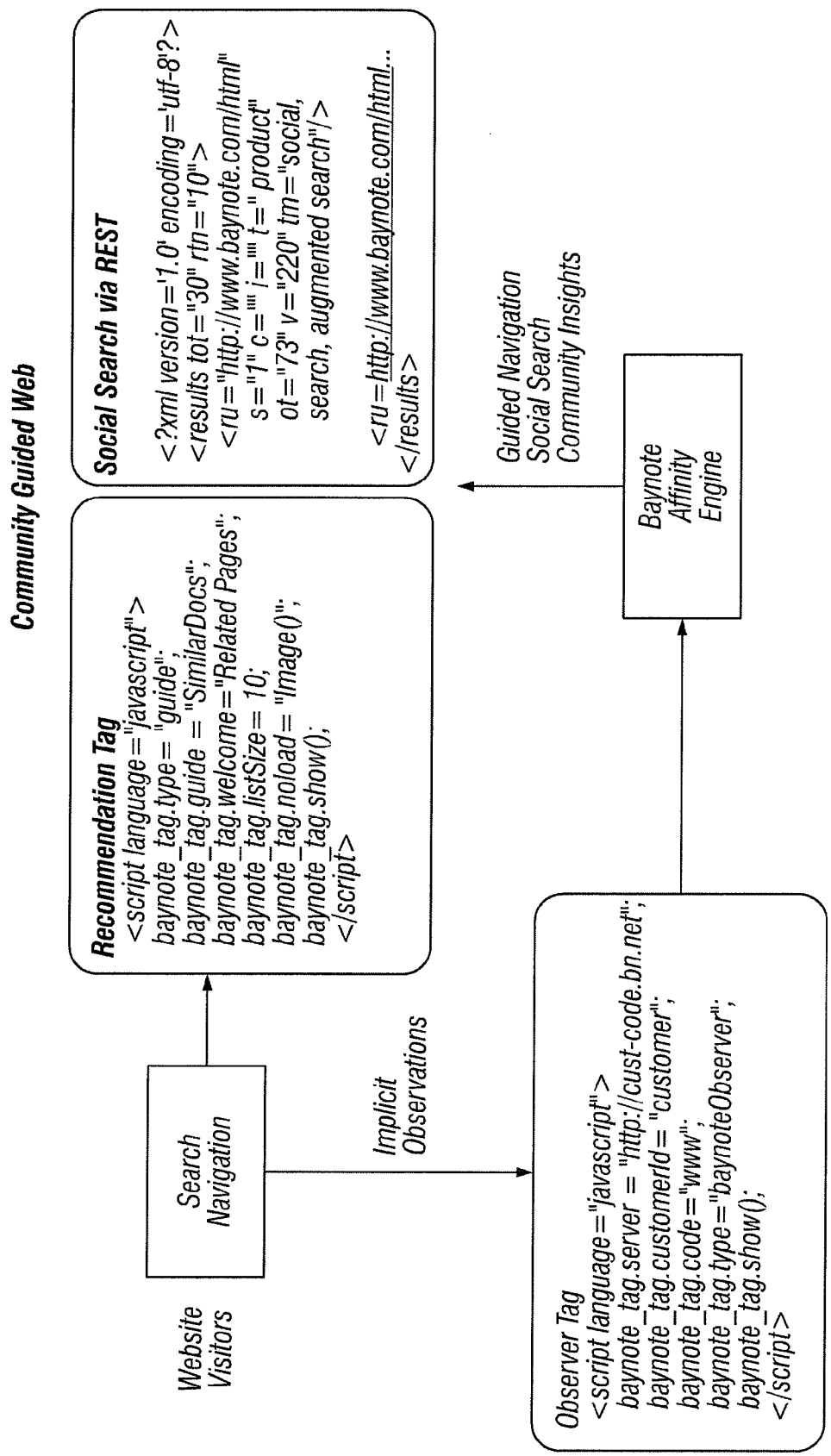
FIG. 29 is a block schematic diagram showing code snippets of the client integration through JavaScript tags and REST in a preferred embodiment of the invention.
Figure 30:
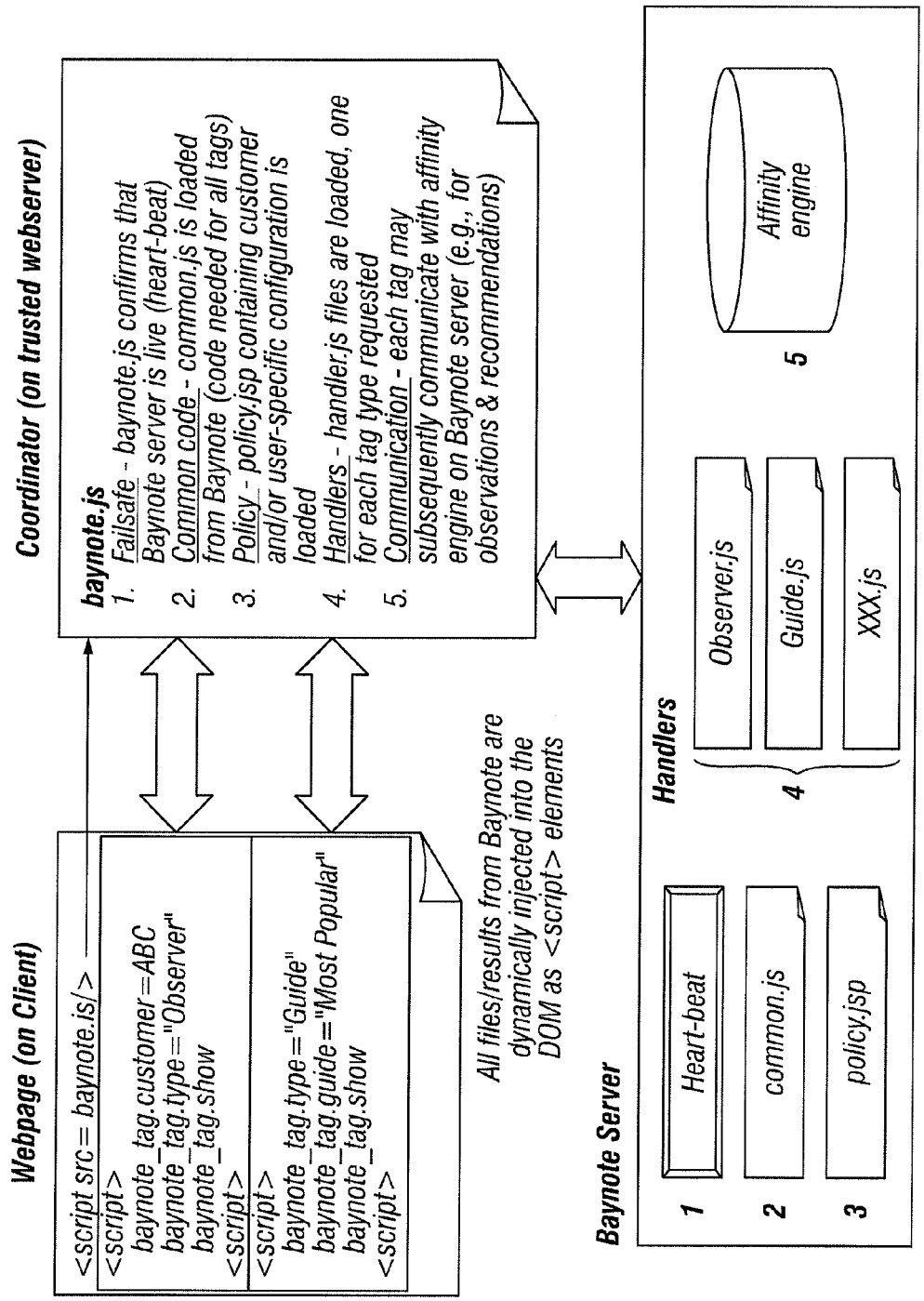
FIG. 30 is a block schematic diagram showing an AJAX platform according to the invention.

The preferred embodiment of the Baynote extension 23 uses a custom-build tag-based AJAX-architecture for collecting Website behaviors from the client as well as serving recommendations to the client. FIG. 29 provides code snippets for JavaScript integration with a client. FIG. 30 is a block schematic diagram showing an AJAX tag platform according to the invention. In FIG. 30, a Web page is displayed on a client and includes a particular script. In this example, all files and results from the system are dynamically injected into the DOMS as <script> elements. A coordinator on a trusted Web server provides such things as a failsafe mechanism, common code, a policy, handlers, and communication facilities. A system server provides such elements as a heartbeat, common JavaScript, policies, handlers, such as an observer and a guide, and the affinity engine. In FIG. 30, the coordinator is a piece of code that sits on the trusted Web site. In the presently preferred embodiment, the coordinator resides on a customer's Web site. Thus, there is a file that serves as coordinator role and that resides on a particular customer Web site, although it could reside on any other trusted Web site. This aspect of the invention concerns the notion of a trusted Web server for failsafe reasons. It is important to be certain that if the invented system crashes that it does not crash or hold up the customer Web site. Thus, a coordinator code is provided as a failsafe procedure. It goes through a failsafe procedure to ensure proper recovery after a crash of the server's Web site.

The architecture of the code is broken down, such that common code is used. Common code or a piece of the code is used for all types of recommendations. Thus, a tag might require common code. The policy may be customer specific or it can be user specific. This concerns how recommendations may be made. The policy information is loaded separately. Then, the code needed for specific tags is loaded as well. For example, if there is a tag for the most popular recommendation, and another one which is the recommendation, then these tags are loaded. The system then loads the code that is necessary for performing the particular tagging operations. A further type of tag or code is the observer that observes what users do, as discussed above. Users do not see the tag, but it is still a tag. The tags must also be able to communicate back to the system. Each of these functions is performed by a piece of code, for example JavaScript, is loaded into the Web page. The JavaScript is loaded into the page through a dynamic script injection.

This aspect of the invention recognizes that a Web page can become more dynamic. For example, there are things such as dynamic HTML and JavaScript which cause things to be added to a page dynamically. If a script tag needs a particular piece of information, then that code is injected into the page. For example, if a policy is needed, then a JavaScript tag is injected into the page that accesses the policy. The policy may require further injection of information, such as handlers. Therefore, the handlers are now dynamically injected as pieces of JavaScript into the page. Communications are handled in a similar matter.

One advantage of the foregoing approach is to provide the option of using first-party cookies or third-party cookies. The main Web page that the customer accesses may be the Web site of a merchant. The merchant communicates with the system to get the information with regard to recommendations and the like.

In this case, the merchant is the first party and the system is a third party. As a result of dynamic script injection, the invention allows the setting of cookies in both the first-party domain and in the third-party domain. The ability to set first and third-party cookies also allows the invention to operate in a cross domain.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented context-centric content recommendation method, comprising:
    establishing a current context for a user at a Web site based upon inputs that are representative of user actions at the Web site;
    capturing the user's current context information with an observer tag that is embedded in the Web site;
    determining the user's interest based on various user behaviors collected by the observer tag;
    using full spectrum behavioral fingerprint technology to analyze the behaviors;
    storing all resulting information in a memory as the user's current context vector, the context vector comprising a hybrid vector of terms and documents with weights on each entry reflecting how strongly that term or document reflects the user's current context;
    incrementing the context vector entries corresponding to terms and phrases entered or clicked as a user enters search terms and/or clicks navigation links to capture expressed interest;
    decrementing or decaying corresponding entries as user actions move further into the past;
    incrementing corresponding vector entry for documents that a user clicks on or indicates interest in, as determined based on a user's implicit actions; and
    generating a representation of the user's current context as a context vector for use in making recommendations of content to said user.

2. The method of claim 1, further comprising:
    expanding and refining the context vector into an intent vector, based on affinities and associations learned from aggregated wisdom collected from observations on a community as a whole over a long term;
    wherein the intent vector is created by looking at affinities between terms and documents in the context vector to other terms.

3. The method of claim 2, further comprising:
    determining affinities that allow expansion of the context vector into an intent vector with an affinity engine;
    wherein the affinity engine learns connections between documents and terms, documents and documents, terms and terms, as well as users to other users, documents, and terms by watching all implicit behaviors of a community on a Web site and by applying behavioral fingerprinting and a use rank algorithm to determine interest and associations.

4. The method of claim 3, further comprising:
    identifying a peer group of users who share affinity to a current intent, as well as those users who exhibit behavior most like the current user within the context of that intent, the peer group being represented by a user vector, wherein each user entry in the user vector may have a weight indicating how strong of a peer he is to the current user in a current context.

5. The method of claim 4, further comprising:
    identifying which documents have highest affinity to identified peers within a current intent;
    wherein the affinity engine analyzes an activeness vector, term-doc matrices, and next-step matrices associated with the identified peers, weighted according to their peer weight, to compute the documents with highest affinity to the current intent;
    and wherein the documents are unfiltered recommendations.

6. The method of claim 5, further comprising:
    asking the affinity engine for community information on each of the recommendations;
    wherein the community information is combined with other asset information and displayed to the user to help him understand a community wisdom underlying a recommendation.

7. The method of claim 6, wherein the displayed information comprises any of a number of users in total who found value in a document, a number of peers who associated a document with a current context and/or intent, and terms and/or phrases the community has associated with a document.

8. The method of claim 7, wherein the terms and/or phrases comprise a virtual folksonomy that represents terms that the community has associated to a document;
    wherein said virtual folksonomy is created automatically by the affinity engine based on implicit actions of the community.

* * * * *